(12) United States Patent
Yan et al.

(10) Patent No.: US 12,231,593 B2
(45) Date of Patent: Feb. 18, 2025

(54) DECORATING STRUCTURE, HOUSING ASSEMBLY, ELECTRONIC DEVICE, AND PHOTOELECTRIC ASSEMBLY

(71) Applicant: Honor Device Co., Ltd., Shenzhen (CN)

(72) Inventors: Bin Yan, Shenzhen (CN); Kangle Xue, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 17/905,481

(22) PCT Filed: Apr. 25, 2022

(86) PCT No.: PCT/CN2022/089010
§ 371 (c)(1),
(2) Date: Sep. 1, 2022

(87) PCT Pub. No.: WO2023/024547
PCT Pub. Date: Mar. 2, 2023

(65) Prior Publication Data
US 2024/0205320 A1    Jun. 20, 2024

(30) Foreign Application Priority Data
Aug. 23, 2021   (CN) .......................... 202110970457.5

(51) Int. Cl.
H04M 1/23    (2006.01)
H04M 1/02    (2006.01)
H04M 1/05    (2006.01)

(52) U.S. Cl.
CPC ......... H04M 1/0283 (2013.01); H04M 1/026 (2013.01)

(58) Field of Classification Search
CPC ............................ H04M 1/0283; H04M 1/026
See application file for complete search history.

(56) References Cited

U.S. PATENT DOCUMENTS

2022/0377163 A1*  11/2022  Li .......................... H04M 1/18

FOREIGN PATENT DOCUMENTS

| CN | 107547708 A | 1/2018 |
|----|-------------|--------|
| CN | 212696068 U | 3/2021 |
| CN | 213186172 U | 5/2021 |
| CN | 113225453 A | 8/2021 |
| KR | 20130053681 A | 5/2013 |

OTHER PUBLICATIONS

IP.com (Year: 2024).*
ProQuest (Year: 2024).*

* cited by examiner

Primary Examiner — Moustapha Diaby
(74) Attorney, Agent, or Firm — Slater Matsil, LLP

(57) ABSTRACT

A decorating structure is configured to be mounted to the housing plate of the electronic device, and the housing plate has an outer plate surface and an inner plate surface opposite to each other. The housing plate is provided with a mounting plate hole extending through the outer plate surface and the inner plate surface. The decorating structure includes a base member and an exterior decorating member. The base member includes a base plate and a ring rim connected to a periphery of the base plate. The exterior decorating member includes a main body, and the main body includes a middle portion and an outer ring portion located on an outer ring of the middle portion. The middle portion and the base plate are connected to each other at the mounting plate hole.

20 Claims, 14 Drawing Sheets

DECORATING STRUCTURE, HOUSING ASSEMBLY, ELECTRONIC DEVICE, AND PHOTOELECTRIC ASSEMBLY

CROSS-REFERENCE TO RELATED APPLICATIONS

This application is a National Stage of International Application No. PCT/CN2022/089010, filed on Apr. 25, 2022, which claims priority to Chinese Patent Application No. 202110970457.5, filed on Aug. 23, 2021. Both of the aforementioned applications are hereby incorporated by reference in their entireties.

TECHNICAL FIELD

The present disclosure relates to the field of structures of electronic devices, and in particular, to a decorating structure, a housing assembly, an electronic device, and a photoelectric assembly.

BACKGROUND

A decorating structure is arranged on a housing plate of a housing of some electronic devices (such as a mobile phone, a tablet computer, and the like) for decorating and protecting an element such as a rear camera. These decorating assemblies are generally directly connected to the housing plate by bonding or engagement.

However, such a connection method has problems such as a relatively low connection strength or low reliability and a relatively poor sealing effect.

SUMMARY

This application provides a decorating structure, a housing assembly, an electronic device, and a photoelectric assembly, so as to solve the problems such as relatively low connection reliability and a relatively poor sealing effect of a decorating structure at a housing plate of an existing electronic device.

The embodiments of this application are implemented as follows:

According to a first aspect, an embodiment of this application provides a decorating structure configured to be mounted to a housing plate of an electronic device. The housing plate has an outer plate surface and an inner plate surface opposite to each other. The housing plate is provided with a mounting plate hole extending through the outer plate surface and the inner plate surface. The decorating structure includes a base member and an exterior decorating member. The base member includes a base plate and a ring rim connected to a periphery of the base plate. The exterior decorating member includes a main body. The main body includes a middle portion and an outer ring portion located on an outer ring of the middle portion. The middle portion and the base plate are connected to each other at the mounting plate hole. The ring rim and the outer ring portion are spaced apart from each other and define an annular mating groove, so as to allow a plate body of the housing plate near a periphery of the mounting plate hole of the housing plate to be engaged in the mating groove.

During use of the decorating structure in the embodiment of this application, the base member is mounted from a side of the inner plate surface of the housing plate, so that the ring rim of the base member is attached to the inner plate surface of the housing plate, and the base plate corresponds to the mounting plate hole. The exterior decorating member is connected to the housing plate from a side of the outer plate surface of the housing plate, the middle portion of the main body of the exterior decorating member and the base plate are connected to each other, and the outer ring portion and the ring rim are spaced apart from each other and are arranged oppositely on an outer side and an inner side of the housing plate to sandwich the housing plate therebetween, thereby realizing positioning and mounting.

The base member and the exterior decorating member in the embodiment of this application are respectively mounted from an inner side and an outer side of the housing plate. After the mounting, the housing plate is engaged in the mating groove, and is limited by the ring rim and the outer ring portion from the inner side and the outer side, and therefore the base member and the exterior decorating member are not prone to outward or inward disengagement or swaying, thereby achieving an increased level of firm connection.

In a possible implementation, an outer surface of the ring rim is offset away from the exterior decorating member from an outer surface of the base plate, so that the mating groove is defined between the outer surface of the ring rim and an inner surface of the outer ring portion.

In this implementation, the exterior decorating member may seal and attach a part of the outer plate surface around the mounting plate hole of the housing plate, and seal one layer of the mounting plate hole. The ring rim is approximately attached to the inner plate surface of the housing plate, and the base plate extends into and is engaged in the mounting plate hole. On the one hand, the exterior decorating member can be connected to the base plate, and on the other hand, an other layer of the mounting plate hole is sealed. That is to say, the structure may conveniently realize sealing of two layers while improving the mounting reliability of the exterior decorating member, thereby further strengthening the sealing performance at the mounting plate hole.

In a possible implementation, the outer surface of the base plate and an inner surface of the middle portion are spaced apart from each other to define a gap, and a first sealing ring is arranged in the gap. The first sealing ring is annular and is arranged between the outer surface of the base plate and the inner surface of the middle portion in a sealed manner.

In this implementation, the gap is reserved between the outer surface of the base plate and the inner surface of the middle portion, and the first sealing ring is arranged in the gap, so that an inner space of the sealing ring can be additionally sealed to cover and isolate a sealing hole on an inner side of the sealing ring.

In a possible implementation, the decorating structure further includes a connecting screw. The base plate is provided with a connecting through hole, and a threaded connecting hole is provided at a corresponding position on the middle portion. The connecting screw connects the base plate to the middle portion by screwing through the connecting through hole and the threaded connecting hole. The first sealing ring is an elastic structure that is elastically compressed under pressure in a thickness direction.

In this implementation, the connection is realized by using the connecting screw, and a locking force may be adjusted as required. The elastic first sealing ring may realize the adaptability to a relatively large shape and position tolerance while maintaining the sealing performance. For example, during the mounting, if a distance between the outer surface of the base plate and the inner surface of the middle portion in a required mounting state is smaller than a design value due to reasons such as a structural design tolerance, the connecting screw may be tightened to a greater extent to compress the first sealing ring in the thickness direction, thereby compensating for the mismatch between an actual spacing and the design value.

In other implementations, the connection between the base member and the exterior decorating member may further be realized by engagement.

In a possible implementation, the first sealing ring is formed by a sealing foam or a back adhesive.

The back adhesive can realize the bonding connection between the surfaces, and the thickness is generally relatively small. The sealing foam has a relatively large thickness and certain elasticity, which may be compressed in the thickness direction, so as to compensate for the shape and position tolerance of the structure. In addition, the sealing foam may also have a certain buffering effect on an interaction force between the structures. The sealing foam may also be arranged to have a certain bonding force, so as to realize the bonding between the outer surface of the base plate and the inner surface of the middle portion.

In a possible implementation, the exterior decorating member further includes an extension integrally connected to the main body, and the extension is connected to an outer side of the outer ring portion. The extension has an accommodating cavity configured to accommodate a functional device and a fixed mounting surface configured to mount the functional device. The extension is configured to be superimposed on the outer plate surface of the housing plate outside the mounting plate hole of the housing plate.

The extension is superimposed on a side of the outer plate surface of the housing plate, and the accommodating cavity of the extension may be configured to mount the functional device. That is to say, an overall size of the exterior decorating member is increased, and the setting of the inner structure of the housing plate is not affected.

In a possible implementation, the accommodating cavity is a stepped hole formed by a first slot and a second slot. The first slot extends to an outer surface of the extension, and the second slot extends to an inner surface of the extension. A bottom surface of the second slot faces the inner surface of the extension, and is used as the fixed mounting surface of the functional device.

In this implementation, the accommodating cavity is arranged as the stepped hole, and a stepped surface (the groove bottom surface of the second slot) is used as the fixed mounting surface of the functional device. In this way, the back adhesive may be arranged on the fixed mounting surface, and then the functional device (such as a flash light) may be mounted from a side of the inner surface of the exterior decorating member and bonded to the fixed mounting surface. In addition, the functional device (such as the flash light) is caused to correspond to the first slot, so as to exchange information such as light/heat with the outside.

In a possible implementation, the extension is recessed from the outer surface to the inner surface of the extension to form the accommodating cavity. A bottom surface of the accommodating cavity is used as the fixed mounting surface of the functional device. The decorating structure is further provided with a communication channel. One end of the communication channel extends through a side surface of the accommodating cavity, and an other end of the communication channel extends through a position on the base member corresponding to the mounting plate hole, so as to allow a lead of the functional device to pass through and enter an inner side of the housing plate.

In the implementation, the accommodating cavity is arranged as a blind hole type recessed from the outer surface, and the bottom surface of the accommodating cavity is used as the fixed mounting surface of the functional device, which facilitates the mounting and fixing of the functional device. In addition, the provided communication channel is convenient for leading out the lead of the functional device, and can enter the inner side of the housing plate for wiring through the mounting plate hole.

In a possible implementation, an outer cross-sectional contour of the exterior decorating member is in an elongated shape, a shape of an equilateral polygon, or a circular shape.

The exterior decorating member is arranged outside, which has relatively great impact on the appearance of a product. In this implementation, a shape of the exterior decorating member may be designed to satisfy the requirements.

In a possible implementation, an outer cross-sectional contour of the base plate is in a shape of a cut circle. The outer cross-sectional contour of the exterior decorating member is in a shape of a circle concentric with the cut circle of the base plate, and a secant line of the circle divides the circle into a first cut circle and a second cut circle. A part of the exterior decorating member within the first cut circle is the main body, and a part of the exterior decorating member within the second cut circle is the extension. The first cut circle includes a third cut circle in the middle and a cut circular ring on a periphery of the third cut circle, and a shape of the third cut circle is substantially the same as a shape of the base plate. A part of the main body within the third cut circle is the middle portion, and a part of the main body within the cut circular ring is the outer ring portion.

In the implementation, the exterior decorating member arranged on an outer side of the housing plate is circular as a whole, and has a regular structure and an aesthetic appearance, which facilitates arrangement of a camera and other functional devices on the exterior decorating member. In addition, the main body of the cut circle is correspondingly connected to a plate body on a periphery of the mounting plate hole of the housing plate, so as to cover the mounting plate hole. The extension of the remaining cut circle is attached to the plate body of the housing plate. On the one hand, the overall size of the exterior decorating member and a contact area (a bonding area) with the housing plate are increased, and on the other hand, the extension is located on the outer side of the housing plate and does not affect the arrangement of other structural members (such as a battery and the like) on the inner side of the housing plate.

Optionally, the first cut circle where the main body is located is a major arc circle (larger than a semicircle), which occupies more than half of the exterior decorating member. The second cut circle where the extension is located is a minor arc circle (smaller than a semicircle), which occupies more than half of the exterior decorating member.

In a possible implementation, the exterior decorating member is provided with a plurality of peripheral light-transmitting holes. The plurality of peripheral light-transmitting holes and the accommodating cavity are distributed on a same circumference centered with a center of a circle of the exterior decorating member.

In the implementation, the peripheral light-transmitting holes and the accommodating cavity are combined and distributed on a circumference, which not only can meet the requirement of uniform arrangement of the camera and the functional device as a whole on the exterior decorating member, but also can make full use of the plate surface space of the main body and the extension of the exterior decorating member. In this way, the arrangement of the exterior decorating member is aesthetic and reasonable.

In a possible implementation, a central light-transmitting hole is provided at the center of a circle of the exterior decorating member.

In the implementation, the light-transmitting hole is further provided at the central position of the exterior decorating member, and a device such as the camera may be arranged at the corresponding position.

In a possible implementation, the accommodating cavity extends through the outer surface of the exterior decorating member. A protective lens is connected to the outer surface of the exterior decorating member, and the protective lens is configured to cover an opening of the accommodating cavity on a side of the outer surface.

In the implementation, the accommodating cavity extends through the outer surface of the exterior decorating member, so that the functional device mounted in the accommodating cavity can exchange light/heat with the outside. The protective lens is arranged to protect the internal structure and cover the opening of the accommodating cavity.

In a possible implementation, the protective lens has a light-shielding region and a light-transmitting region. The functional device accommodated in the accommodating cavity can correspond to the light-transmitting region.

In the implementation, the light-shielding region and the light-transmitting region of the protective lens are arranged, so as to ensure light transmission and an aesthetic appearance.

In a possible implementation, the protective lens and the outer surface are sealed and glued by a fourth sealing ring.

In the implementation, the fourth sealing ring may be realized by using the sealing foam, the back adhesive, or the like.

According to a second aspect, an embodiment of this application provides a housing assembly. The housing assembly includes a housing plate and the above decorating structure. The housing plate has an outer plate surface and an inner plate surface opposite to each other, and the housing plate includes a mounting plate hole extending through the outer plate surface and the inner plate surface. The ring rim is engaged with the inner plate surface of the housing plate, and the base plate corresponds to the mounting plate hole. The outer ring portion is bonded to the outer plate surface of the housing plate, and the middle portion corresponds to the base plate and is fixedly connected to the base plate.

The housing assembly in the embodiment of this application may be used in the electronic device, for example, as a back cover structure of the electronic device, and a structure such as the battery is covered inside the electronic device. According to the connection method of the housing plate and the decorating structure of the housing assembly, the decorating structure can be reliably connected to the housing plate, and a joint has desirable sealing performance.

In a possible implementation, an inner surface of the exterior decorating member and the outer plate surface of the housing plate are sealed and glued by a second sealing ring.

In the implementation, the second sealing ring may be a sealing foam or a back adhesive.

In a possible implementation, a third sealing ring is arranged between the ring rim and the housing plate.

In the implementation, the third sealing ring may be a sealing foam or a back adhesive.

The back adhesive can realize the bonding connection between the surfaces, and the thickness is generally relatively small. The sealing foam has a relatively large thickness and certain elasticity, which may be compressed in the thickness direction, so as to compensate for the shape and position tolerance of the structure. In addition, the third sealing ring is arranged as the sealing foam, which may also have a certain buffering effect on the interaction force between the base member and the housing plate. The sealing foam may also be arranged to have a certain bonding force, so as to realize the bonding between the outer surface of the ring rim and the inner plate surface of the housing plate.

According to a third aspect, an embodiment of this application further provides an electronic device. The above housing assembly is used as a cover plate of the electronic device.

A third aspect of the embodiment of this application further provides an electronic device. The electronic device includes a battery, a housing plate, a functional device, and a decorating structure that includes the above exterior decorating member including an extension. The functional device is arranged in the accommodating cavity. The housing plate has an outer plate surface and an inner plate surface opposite to each other. The housing plate includes a mounting plate hole extending through the outer plate surface and the inner plate surface. The ring rim is engaged with the inner plate surface of the housing plate, and the base plate corresponds to the mounting plate hole. The outer ring portion and the extension are bonded to the outer plate surface of the housing plate. The middle portion corresponds to the base plate and is fixedly connected to the base plate. The battery is arranged on a side of the inner plate surface of the housing plate, and corresponds to a part of the housing plate outside the mounting plate hole of the housing plate. A projection of the battery on the inner plate surface and a projection of the extension on the inner plate surface have an overlapping region. The accommodating cavity corresponds to the overlapping region.

In the electronic device, the extension is superimposed on a side of the outer plate surface of the housing plate and has the overlapping region with the battery. The accommodating cavity of the extension may be configured to mount the functional device. That is to say, an overall size of the exterior decorating member is increased, and the arranging of the battery inside the housing plate is not affected, so as to adapt to the battery having a relatively large size. In addition, when the exterior decorating member is subjected to the ambient pressure, the force of the extension of the exterior decorating member can be buffered by the housing plate, so that the force is not directly transferred to the battery, thereby ensuring the safety of the battery in use.

In a possible implementation, the battery includes a battery core and a battery protection board. A projection of the battery core on the inner plate surface and a projection of the extension on the inner plate surface have an overlapping region.

In the implementation, the extension is extended to overlap with the battery core, which further increases the size of the exterior decorating member. In addition, under protection of the housing plate, the safety of the battery core is also desirably guaranteed.

In a possible implementation, the battery includes a battery core and a battery protection board. The battery protection board is located on an end of the battery core close to the mounting plate hole, on an end of the battery core away from the mounting plate hole, or on a side of the battery core.

In the implementation, the battery protection board may be arranged as required.

In a possible implementation, the electronic device further includes a flexible printed circuit configured as a lead of the functional device. The battery includes a battery core and a battery protection board. The battery protection board is located on an end of the battery core close to the mounting plate hole, and a thickness direction space is defined between an upper surface of the battery protection board and the inner plate surface of the housing plate. The ring rim extends into the thickness direction space. The flexible printed circuit includes a U-shaped plate portion and an elastic connection piece, and the U-shaped plate portion includes a first plate portion, a second plate portion, and a third plate portion. The first plate portion is attached and connected to the fixed mounting surface, the third plate portion is attached and connected to the inner surface of the ring rim and extends into the thickness direction space, and the second plate portion passes through the exterior decorating member and the base member and is connected between the first plate portion and the third plate portion. The elastic connection piece is located on an inner side of the base member, and has one end connected to the third plate portion and an other end extending to a position corresponding to the mounting plate hole outside the thickness direction space; The elastic connection piece is elastically deformable along a direction from an inside to an outside relative to the third plate portion, so as to realize electrical and elastic connection of the flexible printed circuit. The functional device is arranged on the first plate portion.

In the implementation, the electrical connection and mechanical connection of the functional device can be realized by the flexible printed circuit, the structure is compact and reasonable, and the connection is convenient. In addition, the ring rim extends into the thickness direction space, that is, has an overlapping part with the housing plate in the thickness direction, which further utilizes the space where the battery is located.

In a possible implementation, the electronic device is a mobile phone. The electronic device further includes a screen, a middle frame, a rear camera, and a functional device. The screen is connected to one side of the middle frame. The housing plate is connected to an other side of the middle frame at an interval, and defines an inner space with the middle frame. The inner space includes a first space configured to accommodate the battery and a second space configured to accommodate the rear camera. The second space corresponds to the mounting plate hole, and the first space corresponds to a part outside the mounting plate hole of the housing plate. The exterior decorating member is provided with a light-transmitting hole, and the base member has a through hole corresponding to the light-transmitting hole. The rear camera is arranged in the second space and corresponds to the light-transmitting hole and the through hole.

This implementation provides an implementation in which the electronic device is a mobile phone.

According to a fourth aspect, an embodiment of this application further provides a photoelectric assembly. The photoelectric element includes a photoelectric element and a decorating structure in which an extension is arranged on the above exterior decorating member. The photoelectric element is arranged in the accommodating cavity and fixedly mounted to the exterior decorating member.

The photoelectric element is assembled on the exterior decorating member, which can facilitate integrated assembling.

BRIEF DESCRIPTION OF THE DRAWINGS

To describe the technical solutions of the embodiments of the present disclosure more clearly, the following briefly describes the accompanying drawings in the embodiments. It should be understood that, the following accompanying drawings show only some embodiments of the present disclosure, which cannot be considered as limitation on the scope. A person of ordinary skill in the art may still derive other accompanying drawings from the accompanying drawings without creative efforts.

REFERENCE NUMERALS OF MAIN ELEMENTS

Figure 1:
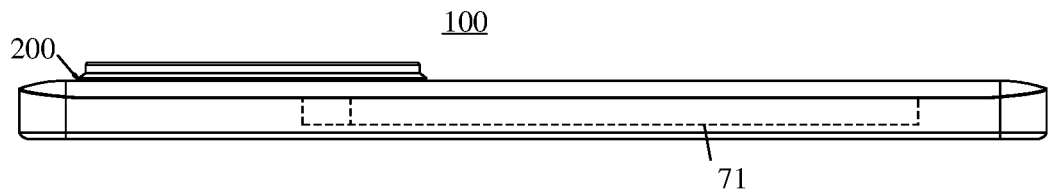
FIG. 1 is a schematic structural diagram of a first implementation of an electronic device according to an embodiment of this application.

Electronic device: 100; Housing assembly: 200; Decorating structure: 300; Housing plate: 10; Exterior decorating member: 20; Main body: 21; Middle portion: 21*a*; Outer ring portion: 21*b*; Extension: 22; Connecting protrusion: 23; Support: 24; Base member: 30; Base plate: 31; Ring rim: 32; Annular connecting wall: 33; Ring portion: 34; First sealing ring: 41; Second sealing ring: 42; Third sealing ring: 43; Fourth sealing ring: 44; Connecting screw: 45; Bonding back adhesive: 46; Protective lens: 50; Light-shielding region: 51; Light-transmitting region: 52; Functional device: 60; Flash light: 61; Color temperature sensor: 62; Flexible printed circuit: 63; U-shaped plate portion: 63*a*; Elastic connection piece: 63*b*; First plate portion: 63*c*; Second plate portion: 63*d*; Third plate portion: 63*e*; Fresnel lens: 64; Rear camera: 65; Photoelectric element: 66; Battery: 71; Battery protection board: 71*a*; Battery core: 71*b*; Screen: 72; Middle frame: 73; Mating groove: C1; Communication channel: C2; Channel: C3; Cut groove: C4; Gap: f1; Mounting plate hole: K1; Light-transmitting hole: K2; Threaded connecting hole: K3; Connecting through hole: K4; Bottom hole: K6; Through hole: K7; First slot: K8; Second slot: K9; Cutting hole: K10; Peripheral light-transmitting hole: K11; Central light-transmitting hole: K12; Hole: K13; Width direction line: L1; Secant line: L2; Outer plate surface: P1; Inner plate surface: P2; Fixed mounting surface: P3; Accommodating cavity: Q1; Inner space: Q2; First space: Q3; Second space: Q4; Thickness direction space: Q5; First cut circle: S1; Second cut circle: S2; Third cut circle: S3; Cut circular ring: S4; Photoelectric assembly: 400.

DETAILED DESCRIPTION OF ILLUSTRATIVE EMBODIMENTS

The technical solutions in the embodiments of this application are clearly and completely described below with reference to the accompanying drawings in the embodiments of this application. Apparently, the described embodiments are merely some rather than all of the embodiments of this application.

It should be noted that, when an element is expressed as "being fixed to" another element, the element may be directly on the another component, or there may be an intermediate element. When an element is expressed as being "connected to" another element, the element may be directly connected to the another component, or there may be an intermediate element. When an element is expressed as being "arranged on" another element, the element may be directly arranged on the another component, or there may be an intermediate element. The terms "vertical", "horizontal", "left", and "right" and similar expressions used in this specification are merely used for the purpose of description.

Unless otherwise defined, meanings of all technical and scientific terms used in this specification are the same as those usually understood by a person skilled in the art to which this application belongs. In this application, terms used in the specification of this application are merely intended to describe objectives of the specific implementations, but are not intended to limit this application.

Some implementations of this application are described below in detail. The following implementations and features in the implementations may be combined with each other in the case of no conflict.

Referring to FIG. 1, an embodiment of this application provides an electronic device 100. The electronic device includes a housing assembly 200 and other structures. The housing assembly 200 is used as a cover plate of the electronic device 100 and may be used on a front side, a back side, or other positions of the electronic device 100. Other structures may include structures such as a battery, a screen, a middle frame, and the like. "A front side" and "a back side" are relative concepts, and are proposed for convenience of description only. For example, when the electronic device is a mobile phone, it is generally considered that a screen side of the electronic device is the front side, and a back cover side of the electronic device is the back side. Certainly, the screen side may also be considered as the back side instead.

The electronic device 100 mentioned herein may be a mobile phone, a tablet computer, a notebook computer, an electronic watch, and the like, or may be a camera, a video monitor, or other electronic devices 100.

Figure 2:
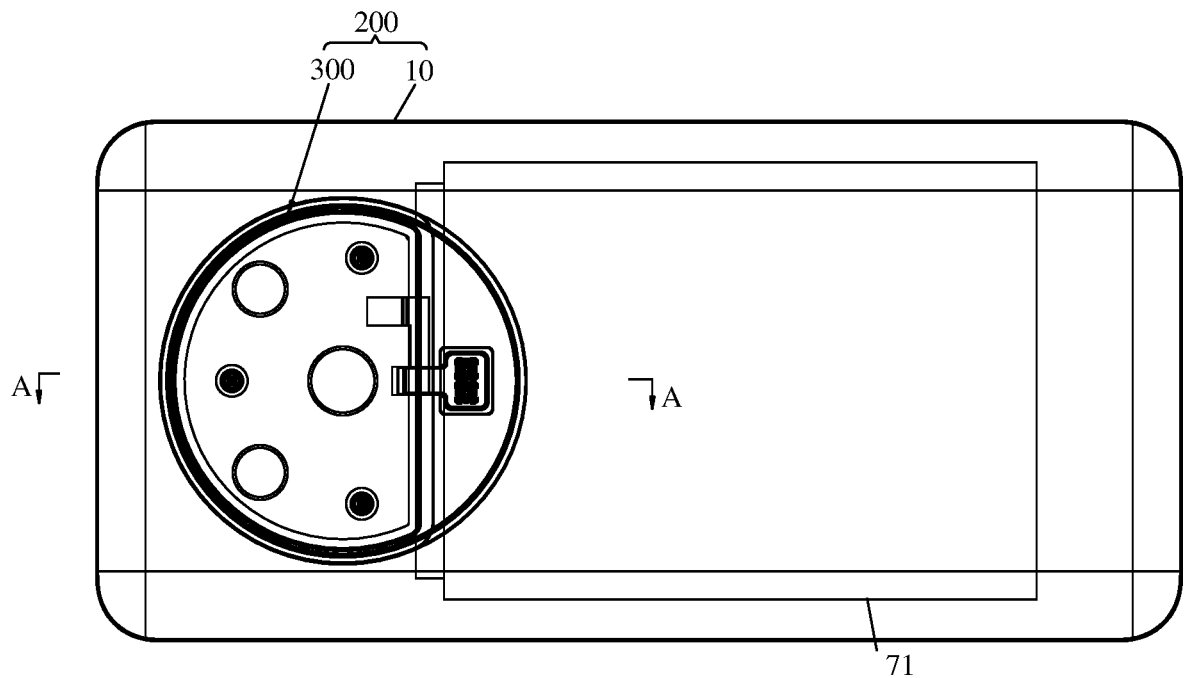
FIG. 2 is a plan view of a housing assembly of the electronic device in FIG. 1, in which a battery is additionally shown by a dashed line.
Figure 3:
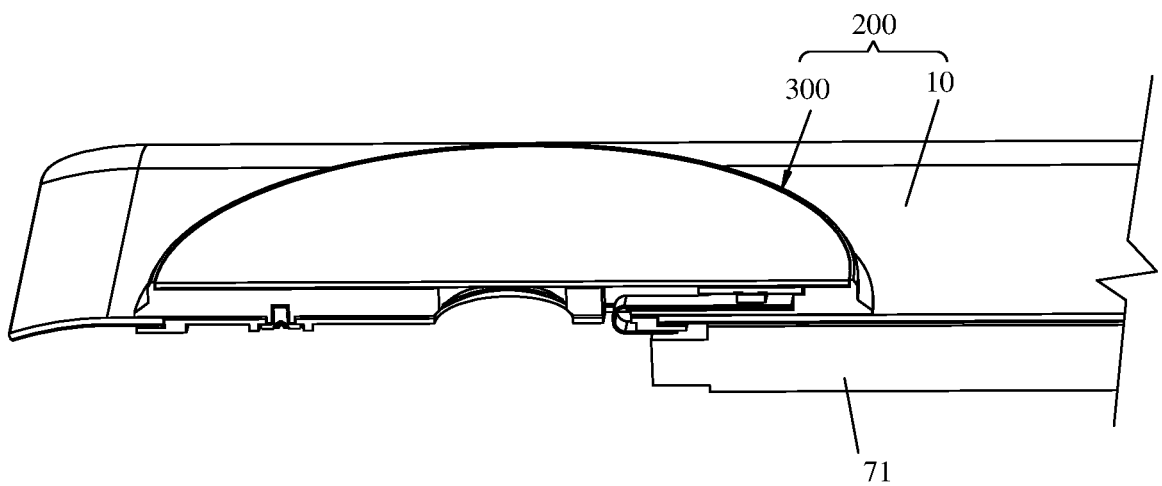
FIG. 3 is a partial three-dimensional cross-sectional view of the housing assembly shown in FIG. 2, in which a battery is additionally shown by a dashed line.

Referring to FIG. 2 and FIG. 3, the housing assembly 200 provided in the embodiment of this application includes a housing plate 10 and a decorating structure 300. The decorating structure 300 is mounted to the housing plate 10, and the decorating structure and the housing plate can be combined to be configured as the cover plate of the electronic device 100.

Figure 4:
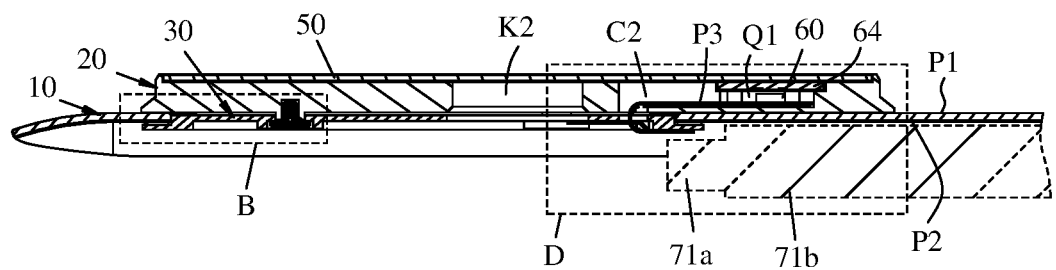
FIG. 4 is a cross-sectional view of the housing assembly shown in FIG. 2 taken along line A-A, in which a battery is additionally shown by a dashed line.
Figure 5:
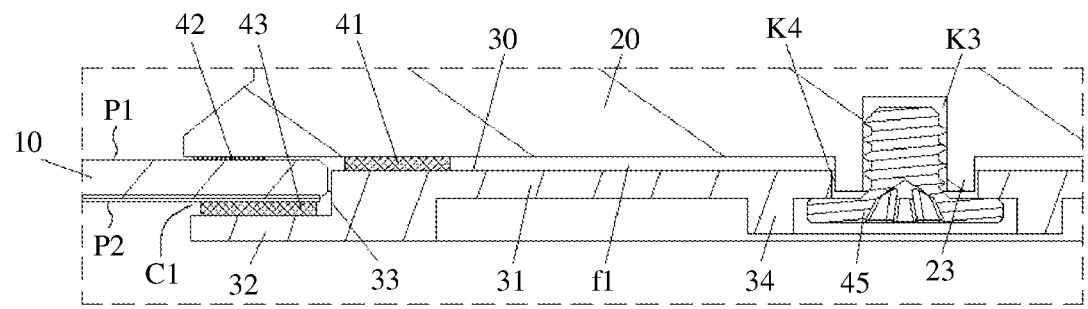
FIG. 5 is an enlarged view of a part B of the housing assembly shown in FIG. 4.
Figure 6:
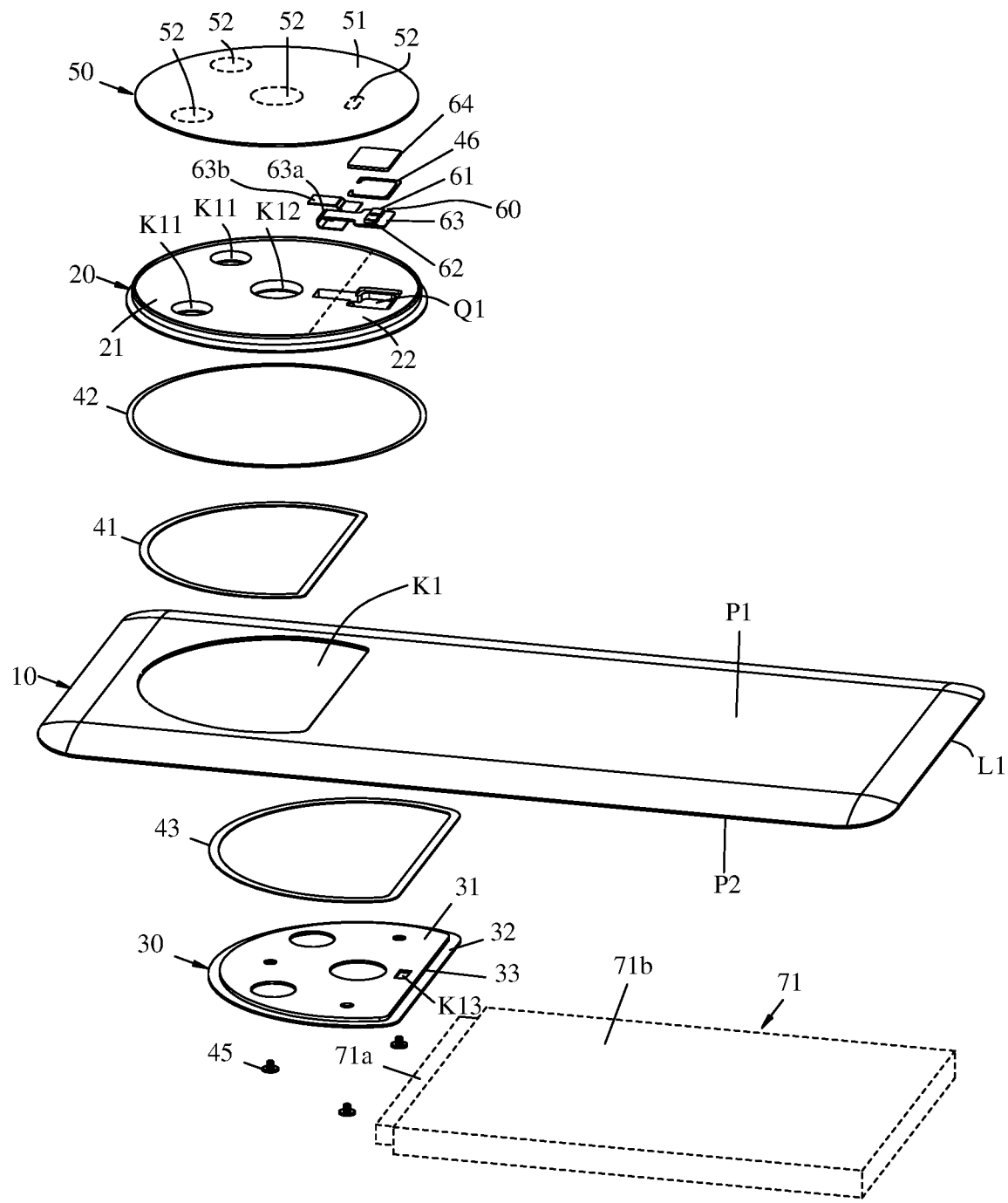
FIG. 6 is an expanded view of the housing assembly shown in FIG. 2, in which a battery is additionally shown by a dashed line.

Referring to FIG. 4 to FIG. 6, the housing plate 10 has an outer plate surface P1 and an inner plate surface P2 opposite to each other, and is provided with a mounting plate hole K1 extending through the outer plate surface P1 and the inner plate surface P2. Herein, the outer plate surface P1 is a surface of the housing plate 10 facing an outer side of the electronic device 100 when assembled on the electronic device 100. Correspondingly, the inner plate surface P2 is a surface of the housing plate 10 facing an inner side of the electronic device 100 when assembled on the electronic device 100.

Figure 7:
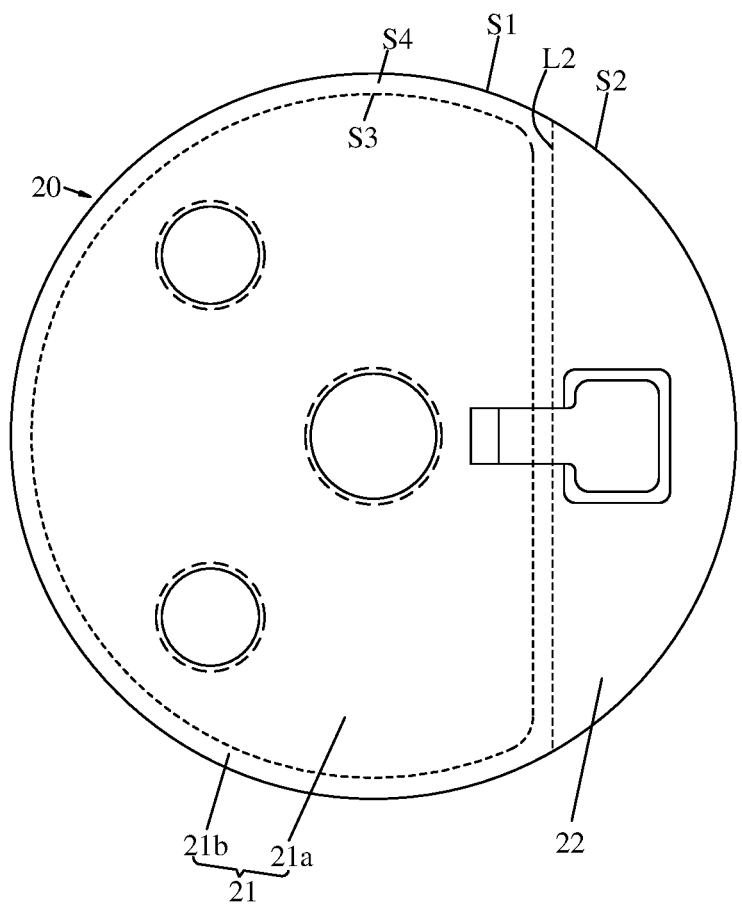
FIG. 7 is a plan view of an exterior decorating member of the housing assembly in FIG. 2.

The decorating structure 300 mainly includes a base member 30 and an exterior decorating member 20. The base member 30 includes a base plate 31 and a ring rim 32 connected to a periphery of the base plate 31. Referring to FIG. 7, the exterior decorating member 20 includes a main body 21. The main body 21 includes a middle portion 21*a* and an outer ring portion 21*b* located on an outer ring of the middle portion 21*a*. The middle portion 21*a* and the base plate 31 are connected to each other at the mounting plate hole K1. The ring rim 32 and the outer ring portion 21*b* are spaced apart from each other and define an annular mating groove C1.

The plate body of the housing plate 10 close to the periphery of the mounting plate hole K1 of the housing plate is engaged in the mating groove C1. In an assembled status, the ring rim 32 is engaged with the inner plate surface P2 of the housing plate 10, and the base plate 31 corresponds to the mounting plate hole K1. The outer ring portion 21*b* is bonded to the outer plate surface P1 of the housing plate 10, and the middle portion 21*a* corresponds to the base plate 31 and is fixedly connected to the base plate 31.

When the decorating structure 300 in the embodiment of this application is assembled with the housing plate 10, the base member 30 is mounted from a side of the inner plate surface P2 of the housing plate 10, so that the ring rim 32 is attached to the inner plate surface P2 of the housing plate 10, and the base plate 31 corresponds to the mounting plate hole K1. The exterior decorating member 20 is connected to the housing plate 10 from a side of the outer plate surface P1 of the housing plate 10, the middle portion 21a of the main body 21 of the exterior decorating member and the base plate 31 are connected to each other, and the outer ring portion 21b and the ring rim 32 are spaced apart from each other and are arranged oppositely on an outer side and an inner side of the housing plate 10 to sandwich the housing plate therebetween, thereby realizing positioning and mounting.

A mounting position of the decorating structure on the housing plate in the embodiment of this application may be arranged as required. For example, when the housing plate 10 is the cover plate of the mobile phone, the shape of the housing plate is roughly rectangular, and the corresponding decorating structure 300 may be arranged at a middle position of the housing plate 10 in a width direction. Certainly, the decorating structure 300 may also be arranged at an upper left corner of the housing plate 10 or other required positions.

The base member 30 and the exterior decorating member 20 in the embodiment of this application are respectively mounted from both sides of the inner plate surfaces and outer plate surfaces P1 of the housing plate 10. After the mounting, the housing plate 10 is engaged in the mating groove C1, and is limited by the ring rim 32 and the outer ring portion 21b from the inner side and the outer side, and therefore the base member 30 and the exterior decorating member 20 are not prone to outward or inward disengagement or swaying, thereby achieving an increased level of firm connection.

In a possible implementation, an outer surface of the ring rim 32 is offset away from the exterior decorating member 20 from an outer surface of the base plate 31, so that the mating groove C1 is defined between the outer surface of the ring rim 32 and an inner surface of the outer ring portion 21b.

The "inner surface" and "outer surface" herein correspond to surfaces facing the inner side and the outer side of the electronic device 100 in the assembled status. Unless otherwise specified, the "inner surface" and "outer surface" appearing in other places in this specification are also interpreted accordingly.

In this implementation, the exterior decorating member 20 may seal and attach a part of the outer plate surface P1 around the mounting plate hole K1 of the housing plate 10, and seal one layer of the mounting plate hole K1. The ring rim 32 is approximately attached to the inner plate surface P2 of the housing plate 10, and the base plate 31 extends into and is engaged in the mounting plate hole K1. On the one hand, the exterior decorating member 20 can be connected to the base plate 31, and on the other hand, an other layer of the mounting plate hole K1 is sealed. That is to say, the structure may conveniently realize sealing of two layers while improving the mounting reliability of the exterior decorating member 20, thereby further strengthening the sealing performance at the mounting plate hole K1.

In this implementation, optionally, the base plate 31 is a flat plate structure, and an outer edge of the base plate extends in a direction perpendicular to the plate surface to form an annular connecting wall 33. An end of the annular connecting wall 33 away from the base plate 31 is extended toward an outer side along a direction parallel to the plate surface of the base plate 31 to form the ring rim 32. In this way, a structure in which the outer surface of the ring rim 32 is offset relative to the outer surface of the base plate 31 may be obtained. Optionally, an offset distance is approximately a thickness of the housing plate 10. In the structure, the annular connecting wall 33 is engaged in the mounting plate hole K1, and a peripheral surface of the annular connecting wall 33 and a hole wall surface of the mounting plate hole K1 may be positioned and engaged.

In other implementations, the middle portion 21a may further be arranged to extend into and be engaged in the mounting plate hole K1 to realize the positioning and engagement between the exterior decorating member 20 and the housing plate 10. Alternatively, the middle portion 21a and the base plate 31 respectively extend into the mounting plate hole K1 by a partial depth to be jointly engaged in the mounting plate hole K1, so as to realize the positioning and engagement between the exterior decorating member 20 and the base member 30 and the housing plate 10 respectively. Certainly, the positioning and engagement between the exterior decorating member 20/base member 30 and the housing plate 10 may further be realized by other structures, and is not limited to be realized in a form of partially extending into the mounting plate hole K1.

Mainly referring to FIG. 4 and FIG. 5, the outer surface of the base plate 31 and an inner surface of the middle portion 21a are spaced apart from each other to define a gap f1, and a first sealing ring 41 is arranged in the gap f1. The first sealing ring 41 is annular (see FIG. 6), and is arranged between the outer surface of the base plate 31 and the inner surface of the middle portion 21a in a sealed manner. That is to say, the base plate 31 may overlap with the middle portion 21a by the first sealing ring 41. Optionally, the first sealing ring 41 may be a circular ring or a closed ring of other shapes. The exterior decorating member 20 is provided with a plurality of light-transmitting holes K2, and at least part of the light-transmitting holes K2 are located on an inner side of the first sealing ring 41. In this implementation, the gap f1 is reserved between the outer surface of the base plate 31 and the inner surface of the middle portion 21a, and the first sealing ring 41 is arranged in the gap f1, so that an inner space Q2 of the sealing ring can be additionally sealed to cover and isolate a sealing hole on an inner side of the sealing ring. The light-transmitting hole K2 may be used in an optical device such as the camera to perform light/heat interaction with the outside. Optionally, the first sealing ring 41 may be a sealing foam or a back adhesive. The back adhesive can realize the bonding connection between the surfaces, and the thickness is generally relatively small. The sealing foam has a relatively large thickness and certain elasticity, which may be compressed in the thickness direction, so as to compensate for the shape and position tolerance of the structure. In addition, the sealing foam may also have a certain buffering effect on an interaction force between the structures. The sealing foam may also be arranged to have a certain bonding force, so as to realize the bonding between the outer surface of the base plate 31 and the inner surface of the middle portion 21a. The thickness direction of the sealing foam mentioned herein is the same as the orientation of the inside and outside.

In this embodiment, a connection between the base plate 31 and the middle portion 21a may be realized by a screw, engagement, or the like. In the implementations shown in FIG. 2 to FIG. 6, the base plate 31 and the middle portion 21a are connected by a connecting screw 45. A specific arrangement manner may be as follows. The base plate 31 is provided with a connecting through hole K4, and a threaded connecting hole K3 is provided at a corresponding position on the middle portion 21a. The connecting screw 45 connects the base plate 31 to the middle portion 21a by screwing through the connecting through hole K4 and the threaded connecting hole K3. The first sealing ring 41 is an elastic structure that is elastically compressible under pressure in a thickness direction. In this implementation, the connection is realized by using the connecting screw 45, and a locking force may be adjusted as required. The elastic first sealing ring 41 may realize the adaptability to a relatively large shape and position tolerance while maintaining the sealing performance. For example, during the mounting, if a distance between the outer surface of the base plate 31 and the inner surface of the middle portion 21a in a required mounting state is smaller than a design value due to reasons such as a structural design tolerance, the connecting screw 45 may be tightened to a greater extent to compress the first sealing ring 41 in the thickness direction, thereby compensating for the mismatch between an actual spacing and the design value. Mainly referring to FIG. 5, optionally, the inner surface of the middle portion 21a protrudes outward near the threaded connecting hole K3 to form a connecting protrusion 23. The threaded connecting hole K3 extends inward from the surface of the connecting protrusion 23. In general, the threaded connecting hole K3 is a blind hole, and does not extend through the outer surface of the middle portion 21a, so as to avoid affecting the appearance of the exterior decorating member 20. The connecting protrusion 23 may be arranged to be positioned and engaged in the connecting through hole K4, so that the exterior decorating member 20 can be positioned by the base member 30. During the assembly, the connecting protrusion 23 of the exterior decorating member 20 is correspondingly engaged in the connecting through hole K4 to realize the positioning of the exterior decorating member 20 and the base member 30. Then, the connecting screw 45 is screwed into the threaded connecting hole K3 from a side of the base member 30 by the connecting through hole K4 to lock the base member 30 and the exterior decorating member 20. In this solution, the connecting protrusion 23 is arranged to be engaged in the connecting through hole K4. On the one hand, the positioning of the exterior decorating member 20 and the base member 30 can be realized, and on the other hand, the connecting protrusion 23 also increases a depth of the threaded connecting hole K3, thereby enhancing the connection reliability. In this implementation, a ring portion 34 surrounding the connecting through hole K4 may further be arranged on the inner surface of the base plate 31, and a space of an inner side of the ring portion 34 and the connecting through hole K4 together form a stepped hole. In this way, a threaded portion of the connecting screw 45 is engaged in the threaded connecting hole K3, and a screw head of the connecting screw 45 is engaged with the inner side of the ring portion 34.

In this embodiment, a number of connecting screws 45 may be set as required. For example, as shown in FIG. 2 to FIG. 6, three connecting screws 45 in a triangular distribution are arranged to realize the connection between the base member 30 and the exterior decorating member 20.

In a possible implementation, a third sealing ring 43 is arranged between the ring rim 32 and the housing plate 10. The third sealing ring 43 may be a sealing foam or a back adhesive. The back adhesive can realize the bonding connection between the surfaces, and the thickness is generally relatively small. The sealing foam has a relatively large thickness and certain elasticity, which may be compressed in the thickness direction, so as to compensate for the shape and position tolerance of the structure. In addition, the third sealing ring 43 is arranged as the sealing foam, which may also have a certain buffering effect on the interaction force between the base member 30 and the housing plate 10. The sealing foam may also be arranged to have a certain bonding force, so as to realize the bonding between the outer surface of the ring rim 32 and the inner plate surface P2 of the housing plate 10.

When the connecting screw 45 locks the base plate 31 and the middle portion 21a, the third sealing ring 43 may be pressed against the housing plate 10 by the ring rim 32 simultaneously, so as to improve the sealing performance of a contact surface between the ring rim 32 and the housing plate 10.

Still referring to FIG. 2 to FIG. 6, in a possible implementation, the exterior decorating member 20 further includes an extension 22 integrally connected to the main body 21. The extension 22 is connected to an outer side of the outer ring portion 21b. The extension 22 has an accommodating cavity Q1 configured to accommodate a functional device 60 and a fixed mounting surface P3 configured to mount the functional device 60. The extension 22 is configured to be superimposed on the outer plate surface P1 of the housing plate 10 outside the mounting plate hole K1 of the housing plate. The extension 22 is superimposed on a side of the outer plate surface P1 of the housing plate 10, and the accommodating cavity Q1 of the extension may be configured to mount the functional device 60. In this way, an overall size of the exterior decorating member 20 is increased, and the arrangement of the inner structure of the housing plate 10 is not affected.

In the embodiment of this application, the exterior decorating member 20 is mounted outside, and the shape of the exterior decorating member has a great impact on an appearance of the structure. The exterior decorating member 20 may be arranged to have an outer cross-sectional contour in a circular shape, a square shape, an elongated shape, a shape of an equilateral polygon, or other shapes.

This embodiment provides an implementation in which the exterior decorating member 20 is arranged in a circular shape. Referring to FIG. 6 (see FIG. 7), in this embodiment, an outer cross-sectional contour of the base plate 31 is a cut circle. The outer cross-sectional contour of the exterior decorating member 20 is in a shape of a circle concentric with the cut circle of the base plate 31, and a secant line L2 of the circle divides the circle into a first cut circle S1 and a second cut circle S2. A part of the exterior decorating member 20 within the first cut circle S1 is the main body 21, and a part of the exterior decorating member 20 within the second cut circle S2 is the extension 22. The first cut circle S1 includes a third cut circle S3 in the middle and a cut circular ring S4 on a periphery of the third cut circle S3, and a shape of the third cut circle S3 is substantially the same as a shape of the base plate 31. A part of the main body 21 within the third cut circle S3 is the middle portion 21a, and a part of the main body 21 within the cut circular ring S4 is the outer ring portion 21b.

The cut circle mentioned herein means that a complete circle is cut into two parts along a chord line or a diameter line of the secant line L2 of the circle, and any one part is a cut circle, which includes a semicircle, a major arc circle larger than the semicircle, and a minor arc circle smaller than the semicircle.

In the implementation, the exterior decorating member 20 arranged on an outer side of the housing plate 10 is circular as a whole, and has a regular structure and an aesthetic appearance, which facilitates arrangement of a camera and other functional devices 60 on the exterior decorating member 20. The functional device 60 may include a flash light 61, an ambient light sensor, a color temperature sensor 62, an infrared lamp, a temperature measurement sensor, a TOF transmitter, a TOF sensor, a camera having a relatively small thickness, or the like. In addition, the main body 21 of the cut circle is correspondingly connected to a plate body on a periphery of the mounting plate hole K1 of the housing plate 10, so as to cover the mounting plate hole K1. The extension 22 of the remaining cut circle is attached to the plate body of the housing plate 10. On the one hand, the overall size of the exterior decorating member 20 and a contact area (a bonding area) with the housing plate 10 are increased, and on the other hand, the extension 22 is located on the outer side of the housing plate 10 and does not affect the arrangement of other structural members (such as a battery 71 and the like) on an inner side of the housing plate 10.

The first cut circle S1 where the main body 21 is located is the major arc circle (larger than the semicircle), which occupies more than half of the exterior decorating member 20. The second cut circle S2 where the extension 22 is located is a minor arc circle (smaller than a semicircle), which occupies a small half of the exterior decorating member 20. The corresponding secant line L2 is the chord line that does not pass through the center of the circle and that is used as the secant line L2.

It should be noted that the secant line L2 and the like described above is merely an auxiliary line for dividing different functional regions, and is not intended to cause the exterior decorating member 20 to be arranged as a plurality of parts separated from each other.

Figure 20:
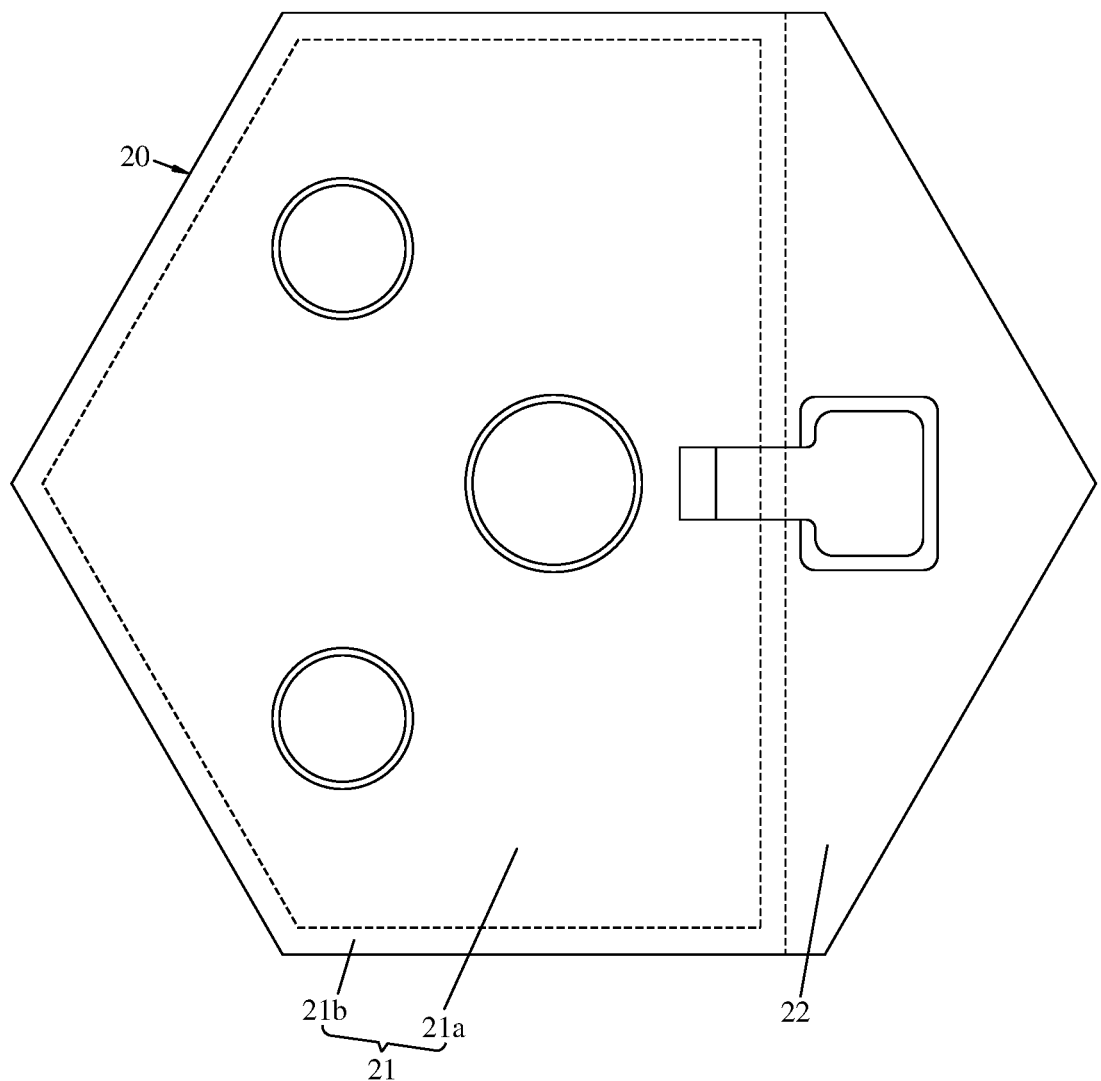
FIG. 20 is a plan view of an outer cross-sectional contour of an exterior decorating member when arranged as an equilateral hexagon.
Figure 21:
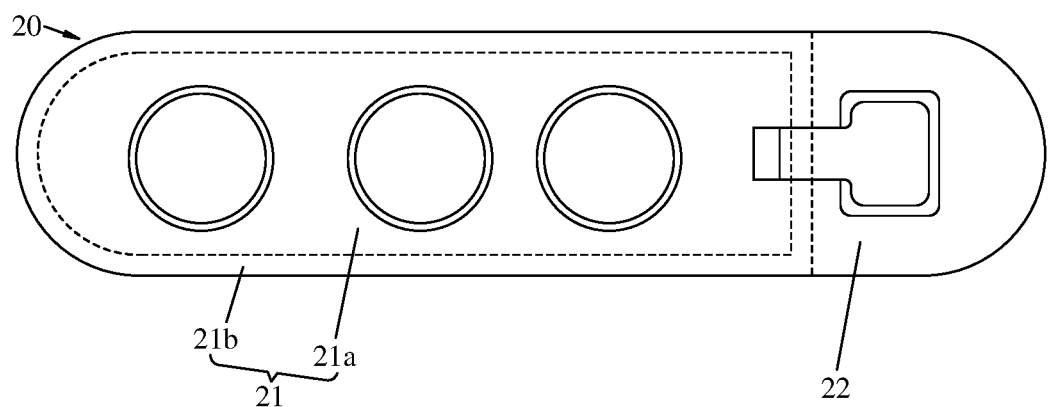
FIG. 21 is a plan view of an outer cross-sectional contour of an exterior decorating member when arranged to be elongated.

The cross-sectional contour of the exterior decorating member 20 shown in FIG. 7 is a circle, and FIG. 20 and FIG. 21 respectively show an arrangement manner in which the outer contour shape of the exterior decorating member 20 is an equilateral hexagon and elongated.

In this embodiment, the mounting plate hole K1 on the housing plate 10 is arranged to match the cut circle of the base plate 31 or the middle portion 21a, so as to realize the positioning and engagement between the base plate 31/exterior decorating member 20 and the mounting plate hole K1.

Referring to FIG. 6, the position of the mounting plate hole K1 may be arranged according to actual requirements. For example, when the housing assembly 200 is used in a back cover of a mobile phone, in order to adapt to a habit of using the mobile phone, the mounting plate hole K1 is provided in an upper half of the housing plate 10. Optionally, a straight line of the outer contour of the mounting plate hole K1 is parallel to a width direction line L1 of the housing plate 10 and is centered in a width direction. In this way, the base member 30 in the shape of a cut circle may be caused to occupy more space of the upper half of the mobile phone, and the space of the lower half is reserved for the battery 71 or other structural members that are required to be arranged inside the mobile phone. However, the middle portion 21a of the exterior decorating member 20 corresponds to the mounting plate hole K1 and is connected to the base plate 31, and the outer ring portion 21b and the extension 22 may be bonded to the housing plate 10 by a sealant. Since the extension 22 may extend to a bottom of the mobile phone outside the housing plate 10 without being restricted by the structural member inside the mobile phone (including the battery 71), and is blocked by the housing plate 10, an acting force applied to the extension 22 can be buffered by the housing plate 10, thereby reducing the impact on the structural member (including the battery 71) on the inner side of the housing plate 10. In addition, the extension 22 can further provide more bonding areas between the exterior decorating member 20 and the housing plate 10, so that the bonding is more reliable, and the sealing performance and the increased level of firm connection between the exterior decorating member 20 and the housing plate 10 are enhanced.

In this embodiment, the ring rim 32 connected to the periphery of the base plate 31 is in a shape of a cut circular ring. During the mounting, the third sealing ring 43 having a corresponding shape may be arranged first, then the third sealing ring 43 is bonded to the ring rim 32, and then the mounting plate hole K1 in the shape of a cut circle is caused to correspond to the base plate 31 in the shape of a cut circle to press fit and bond the base member 30 to the outer plate surface P1 of the housing plate 10. Due to the engagement of the cut circles, the base member 30 can enter and be attached to the housing plate 10 only when the base plate 31 is adjusted to the state corresponding to the mounting plate hole K1 in a circumferential direction. Therefore, the problem that the second sealing ring 42 is required to be broken again and remounted due to an incorrect position after bonding may be avoided.

Upon completion of the mounting of the base member 30, the exterior decorating member 20 may be mounted. During the mounting, the first sealing ring 41 may be bonded to the outer surface of the base plate 31 in advance. The first sealing ring 41 may be arranged to be in the shape of the cut circular ring S4 and is correspondingly bonded to an outer edge of the base plate 31. Then, the connecting protrusion 23 of the exterior decorating member 20 is mounted into the exterior decorating member 20 in such a way that the connecting protrusion corresponds to the connecting through hole K4 of the base plate 31, an inner surface of the exterior decorating member 20 is bonded to the outer plate surface P1 of the housing plate 10, and then the connecting screw 45 is screwed in to fasten the exterior decorating member 20 to the base member 30. Certainly, the inner surface of an annular part of the exterior decorating member 20 and the inner surface of the extension 22 may further be coated with an adhesive, so that the exterior decorating member 20 and the outer plate surface P1 of the housing plate 10 are additionally bonded, thereby enhancing the overall bonding strength and the sealing performance of the exterior decorating member 20.

Referring to FIG. 4 and FIG. 6, in this embodiment, the accommodating cavity Q1 extends through the outer surface of the exterior decorating member 20. A protective lens 50 is connected to the outer surface of the exterior decorating member 20, and the protective lens 50 is configured to cover an opening of the accommodating cavity Q1 on a side of the outer surface. In the implementation, the accommodating cavity Q1 extends through the outer surface of the exterior decorating member 20, so that the functional device 60 mounted in the accommodating cavity Q1 can exchange light/heat with the outside. The protective lens 50 is arranged to protect the internal structure and cover the opening of the accommodating cavity Q1. The protective lens 50 may be bonded to the exterior decorating member 20 by the adhesive. In other implementations, the protective lens 50 and the outer surface of the exterior decorating member 20 are sealed and glued by a fourth sealing ring 44 (see FIG. 8). The fourth sealing ring 44 may be realized by using a sealing foam or a back adhesive. Optionally, the protective lens 50 has a light-shielding region 51 and a light-transmitting region 52. The light-shielding region 51 and the light-transmitting region 52 may visually present different effects. For example, the light-shielding region 51 is black as a whole, and the light-transmitting region 52 is in a transparent status, and can reveal the appearance of the inner structure (such as the corresponding camera or the functional device 60 arranged in the accommodating cavity Q1). In order to enhance the appearance effect, the light-transmitting region 52 is arranged as regularly as possible.

Mainly referring mainly to FIG. 4, in this embodiment, the extension 22 is recessed from the outer surface to the inner surface of the extension to form the accommodating cavity Q1. A bottom surface of the accommodating cavity Q1 is used as the fixed mounting surface P3 of the functional device 60. The decorating structure 300 is further provided with a communication channel C2. One end of the communication channel C2 extends through a side surface of the accommodating cavity Q1, and an other end of the communication channel extends through a position on the base member 30 corresponding to the mounting plate hole K1, so as to allow a lead of the functional device 60 to pass through and enter the inner side of the housing plate 10. In the implementation, the accommodating cavity Q1 is arranged as a blind hole type recessed from the outer surface, and the bottom surface of the accommodating cavity Q1 is used as the fixed mounting surface P3 of the functional device 60, which facilitates the mounting and fixing of the functional device 60. In addition, the provided communication channel C2 is convenient for leading out the lead of the functional device 60, and can enter the inner side of the housing plate 10 for wiring through the mounting plate hole K1. Optionally, in this embodiment, the functional device 60 includes a flash light 61 and a color temperature sensor 62. The flash light and the color temperature sensor are integrated and arranged side by side on one end of the flexible printed circuit 63, that is, the flexible printed circuit 63 is configured as the lead of the functional device 60. The end of the flexible printed circuit 63 is attached to the fixed mounting surface P3, and an other end of the flexible printed circuit passes through the communication channel C2 and the mounting plate hole K1 and enters the inner side of the housing plate 10, so as to be connected to a main circuit of the electronic device 100. Optionally, the flexible printed circuit 63 passes through the communication channel C2 and is folded back and bonded to the inner surface of the ring rim 32 by the back adhesive, so as to be fixed and configured to be connected to the main circuit of the electronic device 100. Optionally, a Fresnel lens 64 corresponding to the flash light 61 and the color temperature sensor 62 is arranged at an outer opening of the accommodating cavity Q1, and the Fresnel lens 64 is fixed to the exterior decorating member 20 by a bonding back adhesive 46. In some implementations, referring to FIG. 8, a light-transmitting hole K2 is provided at a center of the exterior decorating member 20 to correspond to the camera. The exterior decorating member 20 is concentrically recessed from a side of the inner surface of the exterior decorating member relative to the light-transmitting hole K2 to form a bottom hole K6, and the bottom hole K6 and the light-transmitting hole K2 form a stepped hole. The exterior decorating member 20 is provided with a channel C3 that radially extends through the bottom hole K6 from a side wall surface of the accommodating cavity Q1. In addition, a through hole K7 corresponding to the light-transmitting hole K2 of the exterior decorating member 20 is provided at the center of the base member 30. In this way, the channel C3, the bottom hole K6, and the through hole K7 of the base member 30 jointly form the communication channel C2 extending through the accommodating cavity Q1 and the mounting plate hole K1, and the lead of the functional device 60 may pass through the connection channel C3 and enter the inner side of the housing plate 10. Certainly, the channel for the lead to pass through the base plate 31 may be a hole K13 (see FIG. 6) that is additionally provided on the base plate 31 and located outside the through hole K7.

Figure 9:
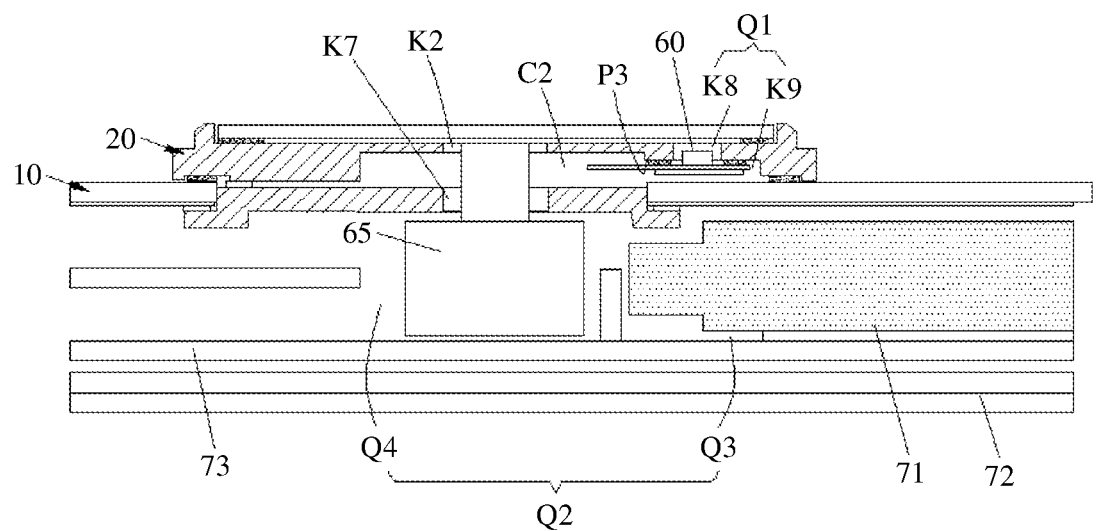
FIG. 9 is a longitudinal cross-sectional view of a third implementation of an electronic device according to an embodiment of this application.

In another implementation, referring to FIG. 9, the accommodating cavity Q1 is a stepped hole formed by a first slot K8 and a second slot K9. The first slot K8 extends to the outer surface of the extension 22, and the second slot K9 extends to the inner surface of the extension 22. A bottom surface of the second slot K9 faces the inner surface of the extension 22, and is used as the fixed mounting surface P3 of the functional device 60. In this implementation, the accommodating cavity Q1 is arranged as the stepped hole, and a stepped surface (the groove bottom surface of the second slot K9) is used as the fixed mounting surface P3 of the functional device 60. In this way, the back adhesive may be arranged on the fixed mounting surface P3, and then the functional device 60 (such as a flash light) may be mounted from a side of the inner surface of the exterior decorating member 20 and bonded to the fixed mounting surface P3. In addition, the functional device 60 (such as the flash light) is caused to correspond to the first slot K8, so as to exchange information such as light/heat with the outside.

Figure 10:
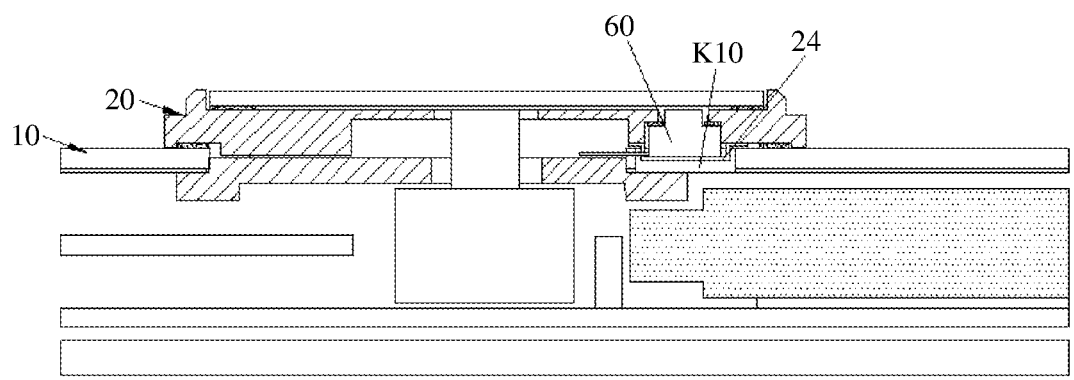
FIG. 10 is a longitudinal cross-sectional view of a fourth implementation of an electronic device according to an embodiment of this application.
Figure 11:
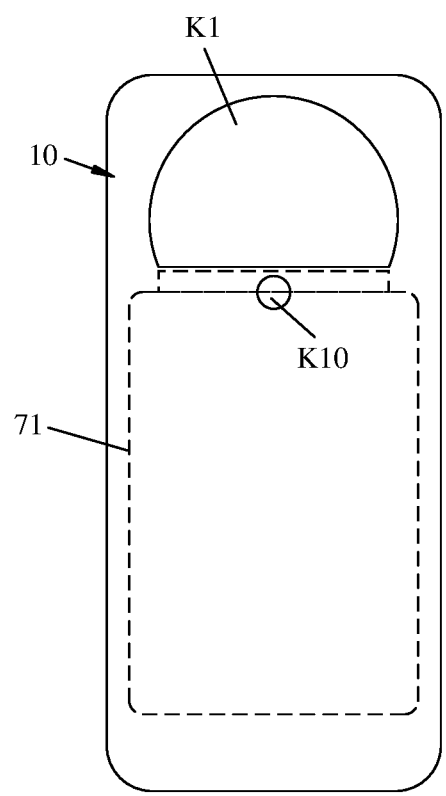
FIG. 11 is a plan view of a housing plate of the electronic device shown in FIG. 10, in which a battery is additionally shown by a dashed line.
Figure 12:
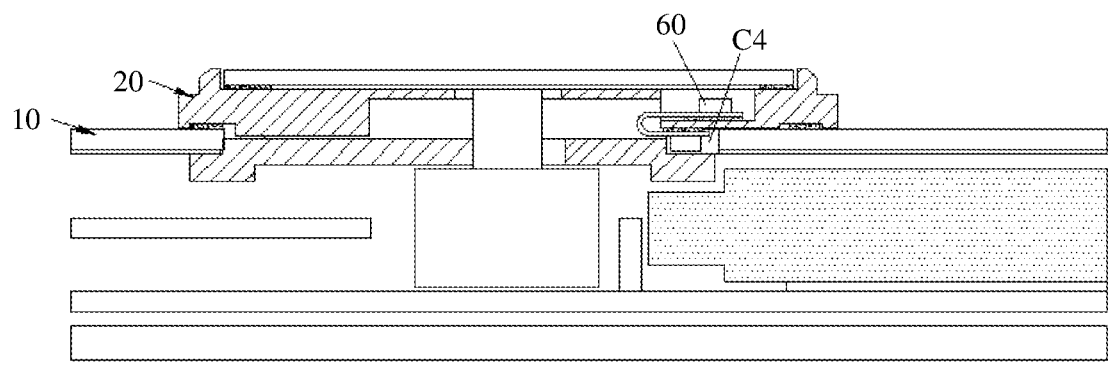
FIG. 12 is a longitudinal cross-sectional view of a fifth implementation of an electronic device according to an embodiment of this application.

In other implementations, a cut hole K10 (see FIG. 10 and FIG. 11) may further be provided on the housing plate 10, and a support 24 fixedly connected to the exterior decorating member 20 is arranged to support the functional device 60. Even if a corresponding part of the housing plate 10 is cut to form a cut groove C4 (see FIG. 12), the functional device 60 or the lead of the functional device 60 may be accommodated at the cut groove C4. The cut groove C4 or the cut hole K10 may correspond to a battery protection board 71a of the battery 71. The cut groove C4 or the cut hole K10 is provided, so as to expand the mounting space of the functional device 60 in the thickness direction. For example, a camera having a slightly large thickness may be mounted.

Figure 13:
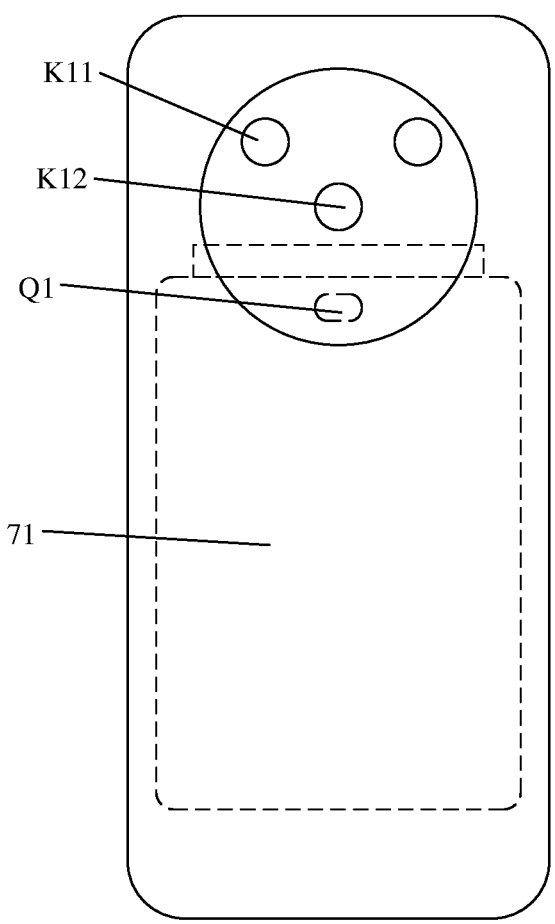
FIG. 13 shows a first distribution manner of an accommodating cavity and a light-transmitting hole on a housing assembly according to an embodiment of this application.
Figure 14:
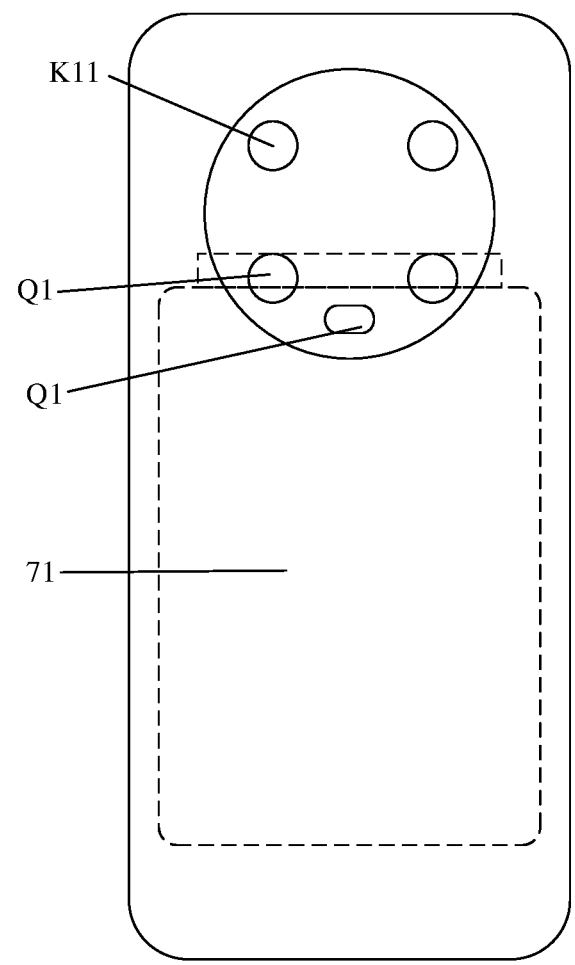
FIG. 14 shows a second distribution manner of an accommodating cavity and a light-transmitting hole on a housing assembly according to an embodiment of this application.
Figure 15:
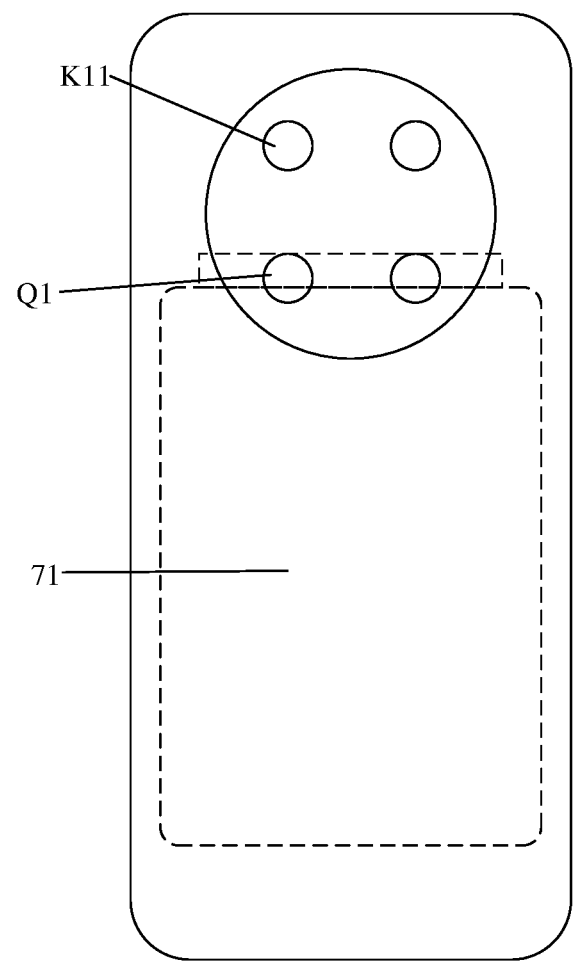
FIG. 15 shows a third distribution manner of an accommodating cavity and a light-transmitting hole on a housing assembly according to an embodiment of this application.

In a possible implementation, referring to FIG. 13 to FIG. 15, the exterior decorating member 20 is provided with a plurality of peripheral light-transmitting holes K11. Each of the peripheral light-transmitting holes K11 and the accommodating cavity Q1 are distributed on a same circumference centered with a center of a circle of the exterior decorating member 20. In the implementation, the peripheral light-transmitting holes K11 and the accommodating cavity Q1 are combined and distributed on a circumference, which not only can meet the requirement of uniform arrangement of the camera and the functional device 60 as a whole on the exterior decorating member 20, but also can make full use of the plate surface space of the main body 21 and the extension 22 of the exterior decorating member 20. In this way, the arrangement of the exterior decorating member 20 is aesthetic and reasonable. Certainly, in other embodiments, the peripheral light-transmitting holes K11 and the accommodating cavity Q1 may also be on different circumferences. Optionally, a central light-transmitting hole K12 is provided at the center of a circle of the exterior decorating member 20. In the implementation, the light-transmitting hole is further provided at the central position of the exterior decorating member 20, and a device such as the camera may be arranged at the corresponding position. In this embodiment, the light-transmitting region 52 is respectively arranged on the protective lens 50 corresponding to the central light-transmitting hole K12, the peripheral light-transmitting holes K11, and the accommodating cavity Q1, and other positions are arranged as the light-shielding region 51. Specifically, referring to FIG. 13, two peripheral light-transmitting holes K11, one accommodating cavity Q1, and one middle light-transmitting hole K12 are arranged, which are roughly in a Y-shaped distribution. The accommodating cavity Q1 is located in the extension 22 and overlaps with the battery 71 in the thickness direction, so that the functional device 60 having a relatively small thickness may be arranged. The light-transmitting regions 52 on the protective lens 50 are correspondingly distributed. As shown in FIG. 14, two peripheral light-transmitting holes K11 and three accommodating cavities Q1 are arranged, among which four rectangles are distributed on the circumference. Two of the accommodating cavities Q1 mainly correspond to a position where the battery protection board 71a is located, and may be used for the camera having a relatively small thickness to be arranged. An other accommodating cavity Q1 is located at the position where the battery core 71b is located, and may be used for other functional devices 60 (such as the flash light 61, or the like) to be arranged. The light-transmitting regions 52 on the protective lens 50 are correspondingly distributed. As shown in FIG. 15, two peripheral light-transmitting holes K11 and two accommodating cavities Q1 are arranged, among which four rectangles are distributed on a circumference. The two accommodating cavities Q1 mainly correspond to the position where the battery protection board 71a is located, and may be used for the camera having a relatively small thickness to be arranged. The light-transmitting regions 52 on the protective lens 50 are correspondingly distributed.

Figure 16:
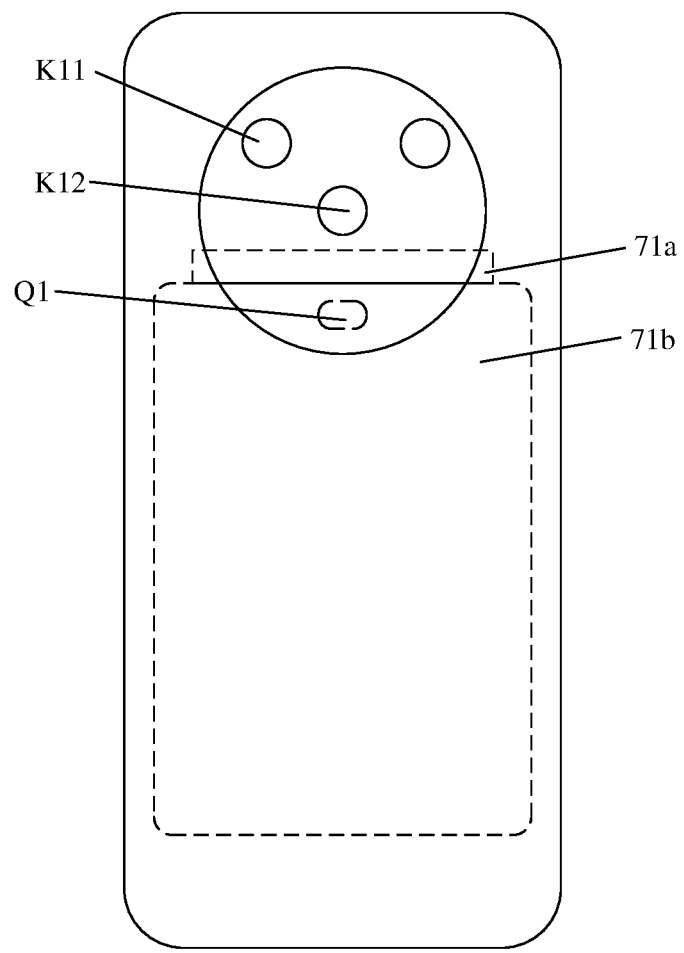
FIG. 16 shows a first mounting manner of a battery of an electronic device according to an embodiment of this application.
Figure 17:
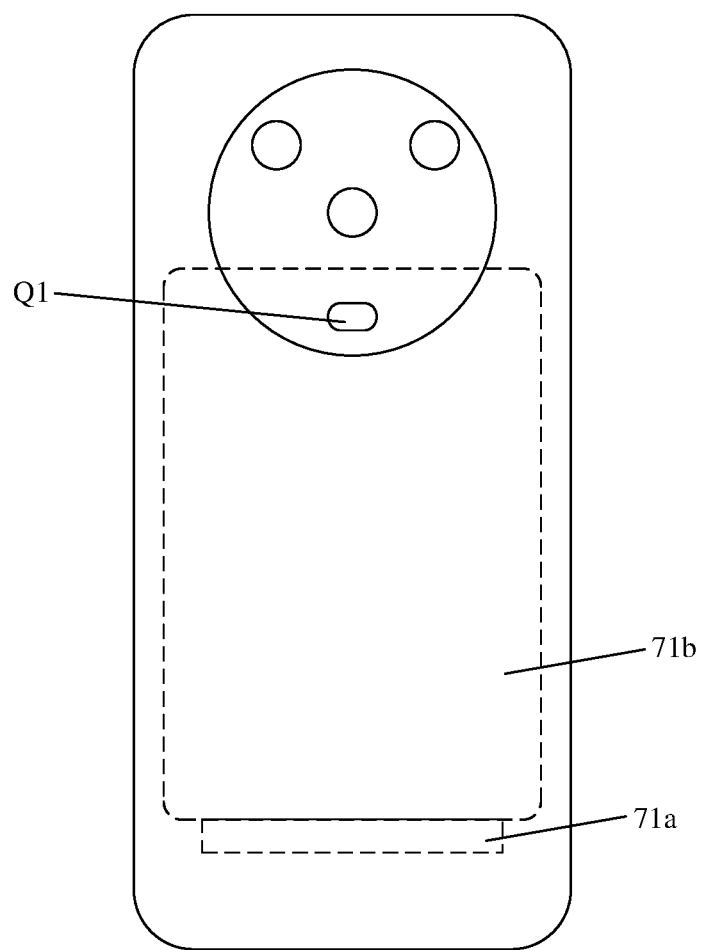
FIG. 17 shows a second mounting manner of a battery of an electronic device according to an embodiment of this application.
Figure 18:
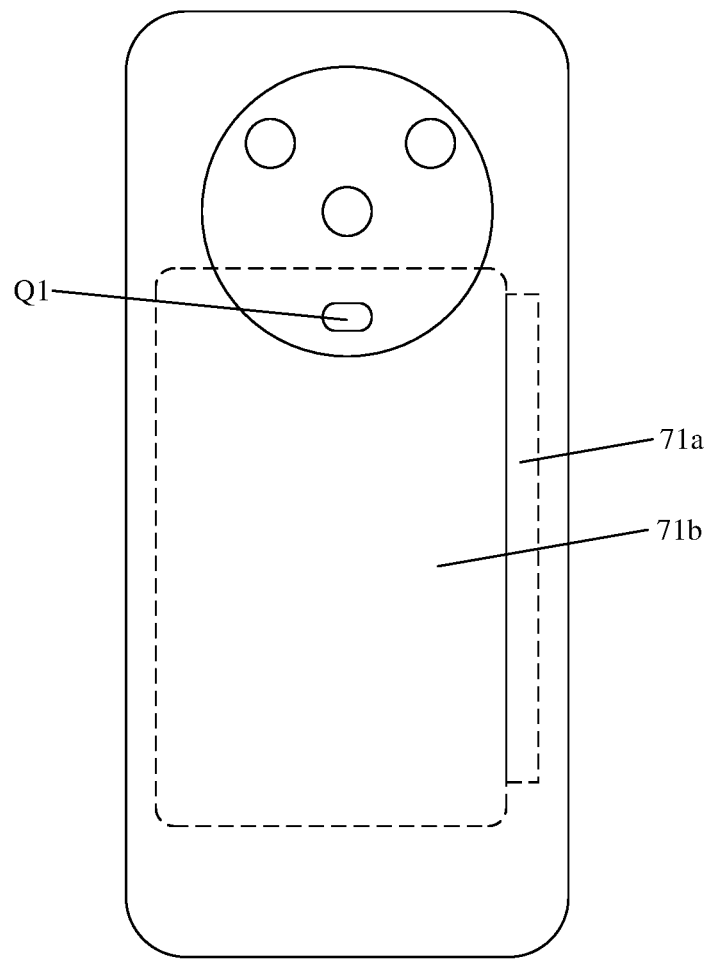
FIG. 18 shows a third mounting manner of a battery of an electronic device according to an embodiment of this application.

Referring to FIG. 1, a battery 71 is arranged in the electronic device 100 of the embodiment of this application. The battery 71 is arranged on a side of the inner plate surface P2 of the housing plate 10 and corresponds to a part of the housing plate 10 outside the mounting plate hole K1 of the housing plate. A projection of the battery 71 on the inner plate surface P2 and a projection of the extension 22 on the inner plate surface P2 have an overlapping region. The accommodating cavity Q1 corresponds to the overlapping region. In this implementation, the battery 71 includes a battery core 71b and a battery protection board 71a. A projection of the battery core 71b on the inner plate surface P2 and a projection of the extension 22 on the inner plate surface P2 have the overlapping region. In the implementation, the extension 22 is extended to overlap with the battery core 71b, which further increases the size of the exterior decorating member 20. In addition, under protection of the housing plate 10, the safety of the battery core 71b is also desirably guaranteed. FIG. 16 to FIG. 18 show a situation where the battery protection board 71a is arranged at different positions. In FIG. 16, the battery protection board 71a is located on an end of the battery core 71b close to the mounting plate hole K1. In FIG. 17, the battery protection board 71a is located on an end of the battery core 71b away from the mounting plate hole K1. In FIG. 18, the battery protection board 71a is located on a side of the battery core 71b.

Figure 22:
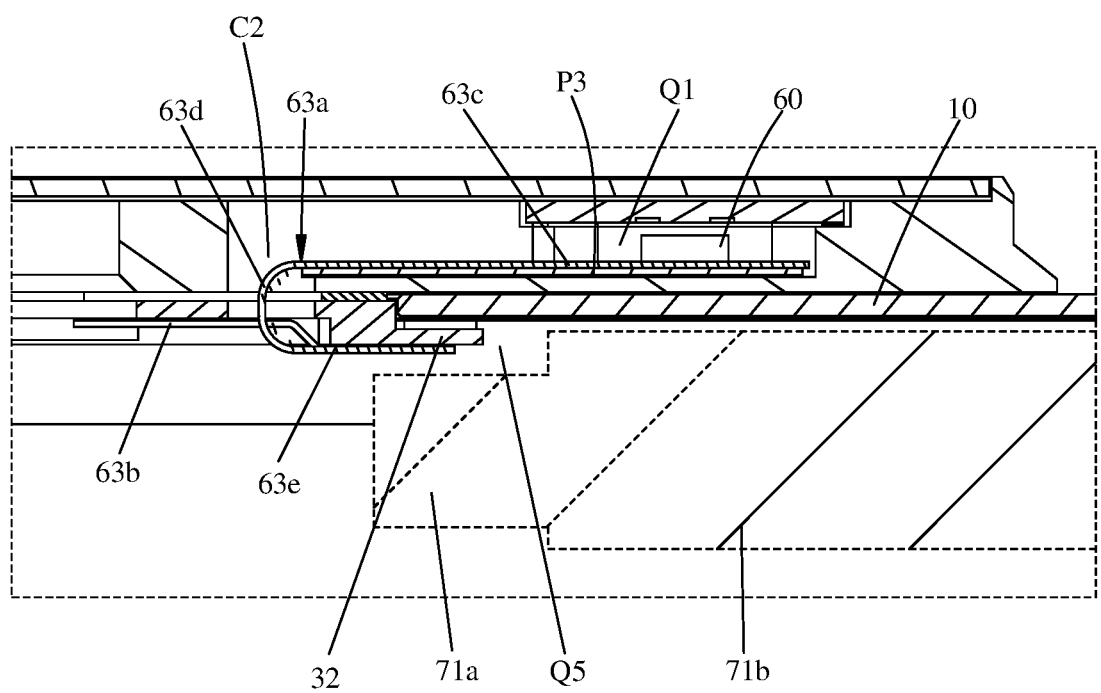
FIG. 22 is an enlarged view of a part D in FIG. 4.

Referring to FIG. 22, for a case where the battery protection board 71a is located on an end of the battery core 71b close to the mounting plate hole K1, a thickness of the battery protection board 71a may be set to be smaller than that of the battery core 71b, so that a thickness direction space Q5 is defined between an upper surface of the battery protection board 71a and the inner plate surface P2 of the housing plate 10, and the ring rim 32 extends into the thickness direction space Q5. The flexible printed circuit 63 includes a U-shaped plate portion 63a and an elastic connection piece 63b. The U-shaped plate portion 63a includes a first plate portion 63c, a second plate portion 63d, and a third plate portion 63e. The first plate portion 63c is attached and connected to the fixed mounting surface P3, the third plate portion 63e is attached and connected to the inner surface of the ring rim 32 and extends into the thickness direction space Q5, and the second plate portion 63d passes through the exterior decorating member 20 and the base member 30 and is connected between the first plate portion 63c and the third plate portion 63e. The elastic connection piece 63b is located on an inner side of the base member 30, and has one end connected to the third plate portion 63e and an other end extending to a position corresponding to the mounting plate hole K1 outside the thickness direction space Q5. The elastic connection piece 63b is elastically deformable along a direction from an inside to an outside relative to the third plate portion 63e, so as to realize electrical and elastic connection of the flexible printed circuit 63. The functional device 60 is arranged on the first plate portion 63c.

In the implementation, the electrical connection and mechanical connection of the functional device 60 can be realized by the flexible printed circuit 63, the structure is compact and reasonable, and the connection is convenient. In addition, the ring rim 32 extends into the thickness direction space Q5, that is, has an overlapping part with the housing plate 10 in the thickness direction, which further utilizes the space of the battery 71 in the thickness direction. In the arrangement solution, the base member 30 and the exterior decorating member 20 are arranged to ensure the increased level of firm mounting of the structure and make full use of the space of a position where the battery 71 is covered in the thickness direction. In addition, the lead (such as the flexible printed circuit 63) of the functional device 60 can be securely arranged, and the lead can be conveniently connected to a main circuit board of the electronic device 100 (not shown).

Figure 8:
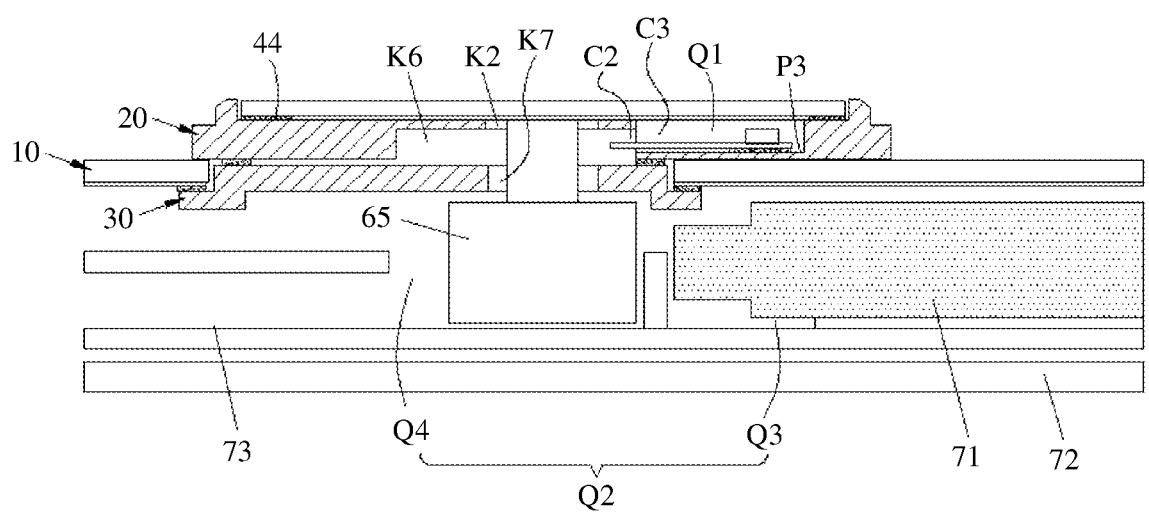
FIG. 8 is a longitudinal cross-sectional view of a second implementation of an electronic device according to an embodiment of this application.

Referring to FIG. 8, when the electronic device 100 is the mobile phone, the electronic device 100 further includes a screen 72, a middle frame 73, a rear camera 65, and a functional device 60. The screen 72 is connected to one side of the middle frame 73. The housing plate 10 is connected to an other side of the middle frame 73 at an interval, and defines an inner space Q2 with the middle frame 73. The inner space Q2 includes a first space Q3 configured to accommodate the battery 71 and a second space Q4 configured to accommodate the rear camera 65. The second space Q4 corresponds to the mounting plate hole K1, and the first space Q3 corresponds to a part outside the mounting plate hole K1 of the housing plate 10. The exterior decorating member 20 is provided with a light-transmitting hole K2 such as the peripheral light-transmitting holes K11 and/or the central light-transmitting hole K12, and the base member 30 has a through hole K7 corresponding to the light-transmitting hole K2. The rear camera 65 is arranged in the second space Q4 and corresponds to the light-transmitting hole K2 and the through hole K7.

Figure 19:
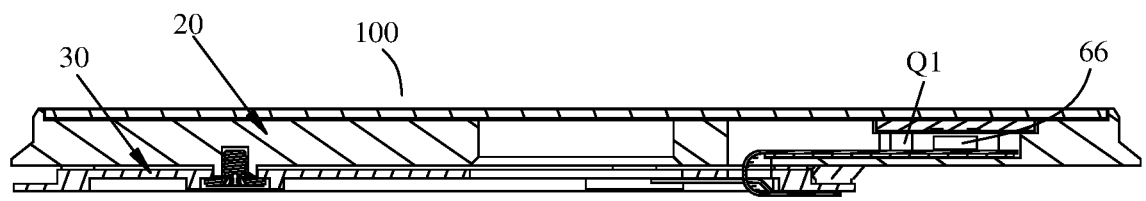
FIG. 19 shows a schematic structural diagram of a photoelectric assembly according to an embodiment of this application.

Referring to FIG. 19, an embodiment of this application further provides a photoelectric assembly 400. The photoelectric element includes a photoelectric element 66 and a decorating structure 300 in which an extension 22 is arranged on the above exterior decorating member 20. The photoelectric element 66 is arranged in the accommodating cavity Q1 and fixedly mounted to the exterior decorating member 20. The photoelectric element 66 in this embodiment may be an element capable of receiving or processing an optical/electrical signal in the above functional device 60. The photoelectric element is assembled on the exterior decorating member 20, which can facilitate integrated assembling.

The foregoing implementations are merely used for describing the technical solutions of this application, but are not intended to limit this application. Although this application is described in detail with reference to the exemplary implementations, a person of ordinary skill in the art should understand that, modifications or equivalent replacements may be made to the technical solutions of this application without departing from the spirit and scope of the technical solutions of this application.

What is claimed is:

1. A housing assembly, comprising:
a housing plate, having an outer plate surface and an inner plate surface opposite to each other and comprising a mounting plate hole extending through the outer plate surface and the inner plate surface; and
a decorating structure comprising:
a base member, comprising a base plate and a ring rim connected to a periphery of the base plate; and
an exterior decorating member, comprising a main body, wherein the main body comprises a middle portion and an outer ring portion located on an outer ring of the middle portion;
wherein the middle portion and the base plate are connected to each other at the mounting plate hole, and the ring rim and the outer ring portion are spaced apart from each other and define an annular mating groove;
wherein an outer surface of the base plate and an inner surface of the middle portion are spaced apart from each other to define a gap;
wherein a first sealing ring is arranged in the gap, and the first sealing ring is annular and is arranged between the outer surface of the base plate and the inner surface of the middle portion in a sealed manner
wherein the ring rim is engaged with the inner plate surface of the housing plate, and the base plate corresponds to the mounting plate hole; and
wherein the outer ring portion is bonded to the outer plate surface of the housing plate, and the middle portion corresponds to the base plate and is fixedly connected to the base plate.

2. The housing assembly of claim 1, wherein an outer surface of the base plate and an inner surface of the middle portion are spaced apart from each other to define a gap; and
wherein a first sealing ring is arranged in the gap, and the first sealing ring is annular and is arranged between the outer surface of the base plate and the inner surface of the middle portion in a sealed manner.

3. The housing assembly of claim 2, wherein the decorating structure further comprising a connecting screw; wherein
the base plate is provided with a connecting through hole, and a threaded connecting hole is provided at a corresponding position on the middle portion;
the connecting screw connects the base plate to the middle portion by screwing through the connecting through hole and the threaded connecting hole; and
the first sealing ring is an elastic structure that is elastically compressed under pressure in a thickness direction.

4. The housing assembly of claim 1, wherein the first sealing ring is formed by a sealing foam or a back adhesive.

5. The housing assembly of claim 1, wherein
the exterior decorating member further comprises an extension integrally connected to the main body, the extension is connected to an outer side of the outer ring portion, and the extension has an accommodating cavity configured to accommodate a functional device and a fixed mounting surface configured to mount the functional device; and
the extension is superimposed on the outer plate surface of the housing plate outside the mounting plate hole of the housing plate.

6. The housing assembly of claim 5, wherein the accommodating cavity is a stepped hole formed by a first slot and a second slot, the first slot extends to an outer surface of the extension, and the second slot extends to an inner surface of the extension; and a bottom surface of the second slot faces the inner surface of the extension, and is used as the fixed mounting surface of the functional device.

7. The housing assembly of claim 6, wherein the extension is recessed from the outer surface to the inner surface of the extension to form the accommodating cavity, and a bottom surface of the accommodating cavity is used as the fixed mounting surface of the functional device; and
wherein the decorating structure is provided with a communication channel, one end of the communication channel extends through a side surface of the accommodating cavity, and an other end of the communication channel extends through a position on the base member corresponding to the mounting plate hole, so as to allow a lead of the functional device to pass through and enter an inner side of the housing plate.

8. The housing assembly of claim 5, wherein an outer cross-sectional contour of the exterior decorating member is in an elongated shape, a shape of an equilateral polygon, or a circular shape.

9. The housing assembly of claim 5, wherein
an outer cross-sectional contour of the base plate is in a shape of a cut circle;
an outer cross-sectional contour of the exterior decorating member is in a shape of a circle concentric with the cut circle of the base plate, a secant line of the circle divides the circle into a first cut circle and a second cut circle, a part of the exterior decorating member within the first cut circle is the main body, and a part of the exterior decorating member within the second cut circle is the extension; and
the first cut circle comprises a third cut circle in the middle and a cut circular ring on a periphery of the third cut circle, a shape of the third cut circle is substantially the same as a shape of the base plate, a part of the main body within the third cut circle is the middle portion, and a part of the main body within the cut circular ring is the outer ring portion.

10. The housing assembly of claim 9, wherein
the exterior decorating member is provided with a plurality of peripheral light-transmitting holes; and
the plurality of peripheral light-transmitting holes and the accommodating cavity are distributed on a same circumference centered with a center of a circle of the exterior decorating member.

11. The housing assembly of claim 10, wherein a central light-transmitting hole is provided at the center of the circle of the exterior decorating member.

12. The housing assembly of claim 5, wherein
the accommodating cavity extends through an outer surface of the exterior decorating member; and
a protective lens is connected to the outer surface of the exterior decorating member, and the protective lens is configured to cover an opening of the accommodating cavity on a side of the outer surface.

13. The housing assembly of claim 12, characterized in that the protective lens has a light-shielding region and a light-transmitting region; and the functional device accommodated in the accommodating cavity corresponds to the light-transmitting region.

14. An electronic device, comprising:
a housing assembly as at least one cover plate of the electronic device;
wherein the housing assembly comprising:
a housing plate, having an outer plate surface and an inner plate surface opposite to each other and comprising a mounting plate hole extending through the outer plate surface and the inner plate surface; and
a decorating structure comprising:
a base member, comprising a base plate and a ring rim connected to a periphery of the base plate; and
an exterior decorating member, comprising a main body, wherein the main body comprises a middle portion and an outer ring portion located on an outer ring of the middle portion;
wherein the middle portion and the base plate are connected to each other at the mounting plate hole, and the ring rim and the outer ring portion are spaced apart from each other and define an annular mating groove;
wherein an outer surface of the base plate and an inner surface of the middle portion are spaced apart from each other to define a gap;
wherein a first sealing ring is arranged in the gap, and the first sealing ring is annular and is arranged between the outer surface of the base plate and the inner surface of the middle portion in a sealed manner;
wherein the ring rim is engaged with the inner plate surface of the housing plate, and the base plate corresponds to the mounting plate hole; and
wherein the outer ring portion is bonded to the outer plate surface of the housing plate, and the middle portion corresponds to the base plate and is fixedly connected to the base plate.

15. The housing assembly of claim 14, wherein an outer surface of the base plate and an inner surface of the middle portion are spaced apart from each other to define a gap; and
wherein a first sealing ring is arranged in the gap, and the first sealing ring is annular and is arranged between the outer surface of the base plate and the inner surface of the middle portion in a sealed manner.

16. The housing assembly of claim 15, wherein the decorating structure further comprising a connecting screw; wherein
the base plate is provided with a connecting through hole, and a threaded connecting hole is provided at a corresponding position on the middle portion;
the connecting screw connects the base plate to the middle portion by screwing through the connecting through hole and the threaded connecting hole; and
the first sealing ring is an elastic structure that is elastically compressed under pressure in a thickness direction.

17. An electronic device, comprising:
a battery;
a housing plate, having an outer plate surface and an inner plate surface opposite to each other and comprising a mounting plate hole extending through the outer plate surface and the inner plate surface; and a decorating structure; and
a functional device arranged in an accommodating cavity;
wherein the decorating structure comprising:
a base member, comprising a base plate and a ring rim connected to a periphery of the base plate; and
an exterior decorating member, comprising a main body, wherein the main body comprises a middle portion and an outer ring portion located on an outer ring of the middle portion;
wherein the middle portion and the base plate are connected to each other at the mounting plate hole, and the ring rim and the outer ring portion are spaced apart from each other and define an annular mating groove;
wherein an outer surface of the base plate and an inner surface of the middle portion are spaced apart from each other to define a gap;
wherein a first sealing ring is arranged in the gap, and the first sealing ring is annular and is arranged between the outer surface of the base plate and the inner surface of the middle portion in a sealed manner;
wherein the exterior decorating member further comprises an extension integrally connected to the main body, the extension is connected to an outer side of the outer ring portion, and the extension has the accommodating cavity configured to accommodate the functional device and a fixed mounting surface configured to mount the functional device; and
wherein the extension is superimposed on the outer plate surface of the housing plate outside the mounting plate hole of the housing plate;
wherein the ring rim is engaged with the inner plate surface of the housing plate, the base plate corresponds to the mounting plate hole, the outer ring portion and the extension are bonded to the outer plate surface of the housing plate, and the middle portion corresponds to the base plate and is fixedly connected to the base plate;
wherein the battery is arranged on a side of the inner plate surface of the housing plate, and corresponds to a part of the housing plate outside the mounting plate hole of the housing plate; and
wherein a projection of the battery on the inner plate surface and a projection of the extension on the inner plate surface have an overlapping region, and the accommodating cavity corresponds to the overlapping region.

18. The electronic device of claim 17, wherein the battery comprises a battery core and a battery protection board, and a projection of the battery core on the inner plate surface and the projection of the extension on the inner plate surface have an overlapping region.

19. The electronic device of claim 17, wherein the battery comprises a battery core and a battery protection board, and the battery protection board is located on an end of the battery core close to the mounting plate hole.

20. The electronic device of claim 17, wherein the battery comprises a battery core and a battery protection board, and the battery protection board is located on an end of the battery core away from the mounting plate hole.

* * * * *